(12) United States Patent
Meng et al.

(10) Patent No.: US 11,307,460 B2
(45) Date of Patent: Apr. 19, 2022

(54) BACKLIGHT MODULE AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xianqin Meng, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/959,204

(22) PCT Filed: Dec. 13, 2019

(86) PCT No.: PCT/CN2019/125201
§ 371 (c)(1),
(2) Date: Jun. 30, 2020

(87) PCT Pub. No.: WO2020/173181
PCT Pub. Date: Sep. 3, 2020

(65) Prior Publication Data
US 2021/0223633 A1 Jul. 22, 2021

(30) Foreign Application Priority Data
Feb. 26, 2019 (CN) .......................... 201910144694.9

(51) Int. Cl.
*G02F 1/13357* (2006.01)
*G02F 1/1335* (2006.01)

(52) U.S. Cl.
CPC .. *G02F 1/133621* (2013.01); *G02F 1/133524* (2013.01); *G02F 1/133615* (2013.01)

(58) Field of Classification Search
None
See application file for complete search history.

(56) References Cited

U.S. PATENT DOCUMENTS

| | | | | |
|---|---|---|---|---|
| 2009/0322986 A1* | 12/2009 | Wei | ................... | G02F 1/133621 349/64 |
| 2012/0127751 A1* | 5/2012 | Kimmel | ............... | G02B 6/0036 362/602 |

(Continued)

FOREIGN PATENT DOCUMENTS

| CN | 104903642 A | 9/2015 |
|---|---|---|
| CN | 106662700 A | 5/2017 |

(Continued)

OTHER PUBLICATIONS

Office Action dated Jan. 20, 2020, issued in counterpart CN Application No. 201910144694.9, with English translation (13 pages).

*Primary Examiner* — Elmito Breval
(74) *Attorney, Agent, or Firm* — WHDA, LLP

(57) ABSTRACT

A backlight module and a display device are provided in embodiments of the present disclosure. The backlight module includes: a light source assembly configured to emit light beams of different colors, the light beams of different colors comprising a light beam of a first color and a light beam of a second color; a light guiding plate comprising: a plurality of light incident portions configured to receive the light beams of different colors, and a light emergent surface, wherein, a plurality of pixel backlight regions are provided on the light emergent surface, each pixel backlight region includes a plurality of light extraction devices, and the plurality of light extraction devices include at least one first light extraction device configured to guide the light beam of the first color of the light beams of different colors from the plurality of light incident portions to exit from the light emergent surface, and at least one second light extraction device configured to guide the light beam of the second color (Continued)

of the light beams of different colors from the plurality of light incident portions to exit from the light emergent surface.

18 Claims, 13 Drawing Sheets

(56) References Cited

U.S. PATENT DOCUMENTS

| | | | |
|---|---|---|---|
| 2014/0300840 A1* | 10/2014 | Fattal | G02F 1/133615 349/15 |
| 2015/0330593 A1 | 11/2015 | Larsen et al. | |
| 2017/0199317 A1 | 7/2017 | Lee et al. | |
| 2018/0107011 A1* | 4/2018 | Lu | H04N 13/32 |
| 2018/0217473 A1 | 8/2018 | Frank et al. | |
| 2019/0302526 A1 | 10/2019 | Tan | |
| 2019/0324186 A1 | 10/2019 | Tan | |
| 2020/0348461 A1 | 11/2020 | Meng et al. | |

FOREIGN PATENT DOCUMENTS

| | | |
|---|---|---|
| CN | 107238974 A | 10/2017 |
| CN | 108572482 A | 9/2018 |
| CN | 108663858 A | 10/2018 |
| CN | 108700714 A | 10/2018 |
| CN | 108710240 A | 10/2018 |
| CN | 109188775 A | 1/2019 |
| CN | 109696721 A | 4/2019 |
| WO | 2016018314 A1 | 2/2016 |
| WO | 2017120346 A1 | 7/2017 |

* cited by examiner

BACKLIGHT MODULE AND DISPLAY DEVICE

CROSS-REFERENCE TO RELATED APPLICATION

This application is a Section 371 National Stage Application of International Application No. PCT/CN2019/125201 filed on Dec. 13, 2019, entitled "backlight module and display device", which claims priority to Chinese Patent Application with the application number 201910144694.9 filed on Feb. 26, 2019 with China Intellectual Property Office, the whole disclosure of which is incorporated herein by reference.

TECHNICAL FIELD

Embodiments of the present disclosure relates to a technical field of display technology, and in particular to a backlight module and a display device.

BACKGROUND

Liquid crystal display devices are widely used in televisions, mobile phones, laptop computers, and many other devices that require image display functions. At present, in an ordinary liquid crystal display device, a backlight module provides an illumination light source; and light emitted from the backlight module is above all converted into linear polarization light in a specific polarization direction by a first polarizer, and is then modulated by a liquid crystal layer, and next, is sequentially transmitted through a second polarizer and a color filter, and is finally emitted as an emergent light which may present a colored image. In this solution, both of the two polarizers and the color filter are indispensable and necessary components.

SUMMARY

The embodiments of the present disclosure have been made to overcome or alleviate at least one aspect of the above mentioned defects and/or deficiencies in the relevant art, by providing a backlight module and a display device.

Following technical solutions are provided in exemplary embodiments of the disclosure.

According to embodiments of the disclosure, there is provided a backlight module, comprising:
a light source assembly configured to emit light beams of different colors, the light beams of different colors comprising a light beam of a first color and a light beam of a second color;
a light guiding plate comprising:
a plurality of light incident portions configured to receive the light beams of different colors, and
a light emergent surface,
wherein, a plurality of pixel backlight regions are provided on the light emergent surface, and each pixel backlight region comprises a plurality of light extraction devices which comprise: at least a first light extraction device configured to guide the light beam of the first color in the light beams of different colors from the plurality of light incident portions to exit from the light emergent surface; and at least a second light extraction device configured to guide the light beam of the second color in the light beams of different colors from the plurality of light incident portions to exit from the light emergent surface.

In some exemplary embodiments, the light source assembly comprises:
a first light source configured to emit the light beam of the first color.
a second light source configured to emit the light beam of the second color; and
a third light source configured to emit a light beam of a third color, and
the plurality of light incident portions comprise:
a first light incident portion configured to receive the light beam of the first color,
a second light incident portion configured to receive the light beam of the second color, and
a third light incident portion configured to receive the light beam of the third color,
wherein, the plurality of light extraction devices further comprise at least a third light extraction device, and the first light extraction device is configured to guide the light beam of the first color from the first light incident portion along a direction perpendicular to the light emergent surface to exit from the light emergent surface, the second light extraction device is configured to guide the light beam of the second color from the second light incident portion along the direction perpendicular to the light emergent surface to exit from the light emergent surface and, the three light extraction device is configured to guide the light beam of the third color from the third light incident portion along the direction perpendicular to the light emergent surface to exit from the light emergent surface.

In some exemplary embodiments, an incidence angle of the light beam of the first color on the light emergent surface is greater than a critical angle of total reflection of the light beam of the first color from inside the light guiding plate towards the light emergent surface and is less than 90°, an incidence angle of the light beam of the second color on the light emergent surface is greater than a critical angle of total reflection of the light beam of the second color from inside the light guiding plate to the light emergent surface and is less than 90°, and an incidence angle of the light beam of the third color on the light emergent surface is greater than a critical angle of total reflection of the light beam of the third color from inside the light guiding plate to the light emergent surface and is less than 90°.

In some exemplary embodiments, the first light incident portion, the second light incident portion and the third light incident portion are respectively located on different sides of the light guiding plate.

In some exemplary embodiments, the first light incident portion comprises a plurality of first light incident regions, and the plurality of first light extraction devices on the light emergent surface are arranged in a plurality of rows, each row of the first light extraction devices is aligned with a respective one of the plurality of first light incident regions:
the second light incident portion comprises a plurality of second light incident regions, and the plurality of second light extraction devices on the light emergent surface are arranged as a plurality of rows, each row of the second light extraction devices is aligned with a respective one of the plurality of second light incident regions; and
the third light incident portion comprises a plurality of third light incident regions, and the plurality of third light extraction devices on the light emergent surface are arranged in a plurality of columns, each column of the third light extraction devices is aligned with a respective one of the plurality of third light incident regions.

In some exemplary embodiments, the first light extraction devices are staggered from all the second light incident regions and all the third light incident regions, the first light incident regions and the second light incident regions are staggered from each other in a direction perpendicular to the light beams of the first color:

the second light extraction devices are staggered from all the first light incident regions and all the third light incident regions; and the third light extraction devices are staggered from all the first light incident regions and all the second light incident regions.

In some exemplary embodiments, adjacent two of the first light incident regions of the first light incident portion is separated from each other by a first light blocking component, adjacent two of the second light incident regions of the second light incident portion is separated from each other by a second light blocking component, and adjacent two of the third light incident regions of the third light incident portion is separated from each other by a third light blocking component.

In some exemplary embodiments, the light emergent surface further comprises an incident light deflection region, and the incident light deflection region is provided with:

a plurality of first deflectors configured to deflect the light beam of the first color from the first light incident portion toward the plurality of first light extraction devices, respectively;

a plurality of second deflectors configured to deflect the light beam of the second color from the second light incident portion toward the plurality of second light extraction devices, respectively; and a plurality of third deflectors configured to deflect the light beam of the third color from the third light incident portion toward the plurality of third light extraction devices, respectively.

In some exemplary embodiments, a light blocking layer is further provided on the incident light deflection region, and the light blocking layer covers the plurality of first deflectors, the plurality of second deflector and the plurality of third deflectors.

In some exemplary embodiments, the first deflectors comprises a plurality of first deflection gratings, the second deflectors comprises a plurality of second deflection gratings, and the third deflectors comprises a plurality of third deflection gratings, respectively.

In some exemplary embodiments, the first light incident portion, the second light incident portion and the third light incident portion are arranged side by side on a same side of the light guiding plate, the first light incident portion comprises a plurality of first light incident regions, the plurality of first deflection gratings are arranged in a row, and orthographic projections of the row of first deflection gratings on the side of the light guiding plate where the first light incident portion is provided at least partially overlap with the first light incident region, the plurality of the first light extraction devices on the light emergent surface are arranged in a plurality of columns, an arrangement direction of the first light extraction devices is perpendicular to an arrangement direction of first deflection gratings, a first side of each of the first deflection gratings faces the first light incident region, and a second side adjacent to the first side of each of the first deflection gratings faces the first light extraction devices;

the second light incident portion comprises a plurality of second light incident regions, the plurality of second deflection gratings are arranged in a row, and orthographic projections of the row of second deflection gratings on the side of the light guiding plate where the second light incident portion is provided at least partially overlap with the second light incident region, the plurality of the second light extraction devices on the light emergent surface are arranged in a plurality of columns, an arrangement direction of the second light extraction devices is perpendicular to an arrangement direction of second deflection gratings, a first side of each of the second deflection gratings faces the second light incident region, and a second side adjacent to the first side of each of the second deflection gratings faces the second light extraction devices; and the third light incident portion comprises a plurality of third light incident regions, the plurality of third deflection gratings are arranged in a row, and orthographic projections of the row of third deflection gratings on the side of the light guiding plate where the third light incident portion is provided at least partially overlap with the third light incident region, the plurality of the third light extraction devices on the light emergent surface are arranged in a plurality of columns, an arrangement direction of the third light extraction devices is perpendicular to an arrangement direction of third deflection gratings, a first side of each of the third deflection gratings faces the third light incident region, and a second side adjacent to the first side of each of the third deflection gratings faces the third light extraction devices.

In some exemplary embodiments, in a direction perpendicular to the arrangement direction of each column of the first light extraction devices, a width of each of the first deflection gratings is equal to a width of each of the first light extraction devices;

in a direction perpendicular to the arrangement direction of each column of the second light extraction devices, a width of each of the second deflection gratings is equal to a width of each of the second light extraction devices; and in a direction perpendicular to the arrangement direction of each column of the third light extraction devices, a width of each of the third deflection gratings is equal to a width of each of the third light extraction devices.

In some exemplary embodiments, an extension direction of grating bars of each of the first deflection gratings is inclined with respect to an incidence direction of the light beam of the first color on the first deflection gratings;

an extension direction of grating bars of each of the second deflection gratings is inclined with respect to an incidence direction of the light beam of the second color on the second deflection gratings; and an extension direction of grating bars of each of the third deflection gratings is inclined with respect to an incidence direction of the light beam of the third color on the third deflection gratings.

In some exemplary embodiments, the first deflectors are configured to change the deflection direction of the light beam of the first color while maintaining an angle of the light beam of the first color with reference to the light emergent surface unchanged, the second deflectors are configured to change the deflection direction of the light beam of the second color while maintaining an angle of the light beam of the second color with reference to the light emergent surface unchanged, and the third deflectors are configured to change the deflection direction of the light beam of the third color while maintaining an angle of the light beam of the third color with reference to the light emergent surface unchanged.

In some exemplary embodiments, the light beams of different colors emitted by the light source assembly are collimated light beams.

In some exemplary embodiments, the plurality of first light extraction devices comprise first light extraction gratings, and the plurality of second light extraction devices comprise second light extraction gratings and the plurality of third light extraction devices comprise third light extraction gratings.

In some exemplary embodiments, an extension direction of grating bars of the first light extraction gratings is perpendicular to an incidence direction of the light beam of the first color on the first light extraction gratings; an extension direction of grating bars of the second light extraction gratings is perpendicular to an incidence direction of the light beam of the second color on the second light extraction gratings; and an extension direction of grating bars of the third light extraction gratings is perpendicular to an incidence direction of the light beam of the third color on the third light extraction gratings.

In some exemplary embodiments, the light guiding plate further comprises a planarization layer, which is located on the light emergent surface and covers the first light extraction gratings, the second light extraction gratings and the third light extraction gratings, and has a refractive index of the planarization layer lower than a refractive index of the light guiding plate.

According to embodiments of the disclosure, there is further provided a display device, comprising:

the backlight module as in any above embodiment, and a liquid crystal display assembly located on a side of the backlight module where the light emergent surface is provided.

In some exemplary embodiments, the liquid crystal display assembly comprises:

a liquid crystal layer;

a plurality of light blocking portions on a side of the liquid crystal layer facing away from the backlight module, orthographic projections of the plurality of light blocking portions on the light emergent surface respectively covering the plurality of light extraction devices in the pixel backlight region, with light transmitting openings being formed between the plurality of light shielding portions; and first electrodes and second electrodes respectively located on both sides of the liquid crystal layer respectively or on a same side of the liquid crystal layer, the first electrodes and the second electrodes are configured to apply a set of voltage signals to the liquid crystal layer to form a liquid crystal grating configured to deflect light beams passing therethrough to exit from the light transmitting openings between the plurality of light blocking portions.

BRIEF DESCRIPTION OF THE DRAWINGS

In order to more clearly illustrate technical solutions of the embodiments of the present disclosure, drawings of the embodiments will be briefly described below. It should be understood that the drawings described below merely relate to some embodiments of the present disclosure, rather than limiting the present disclosure, in which.

DETAILED DESCRIPTION OF EMBODIMENTS

Figure 1:
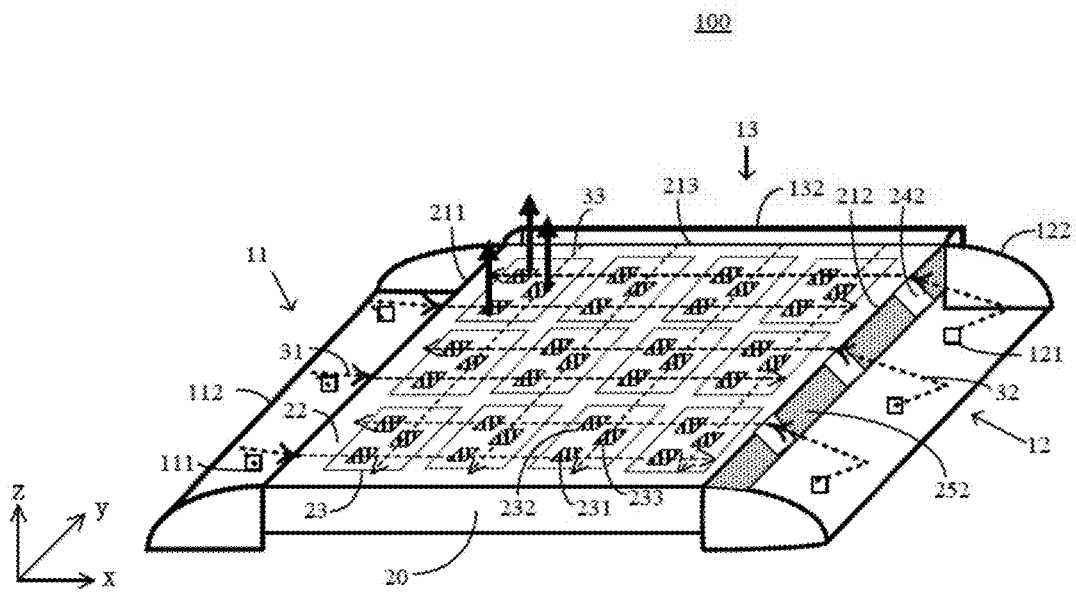
FIG. 1 illustrates a schematic perspective view of a backlight module according to an embodiment of the present disclosure.
Figure 2:
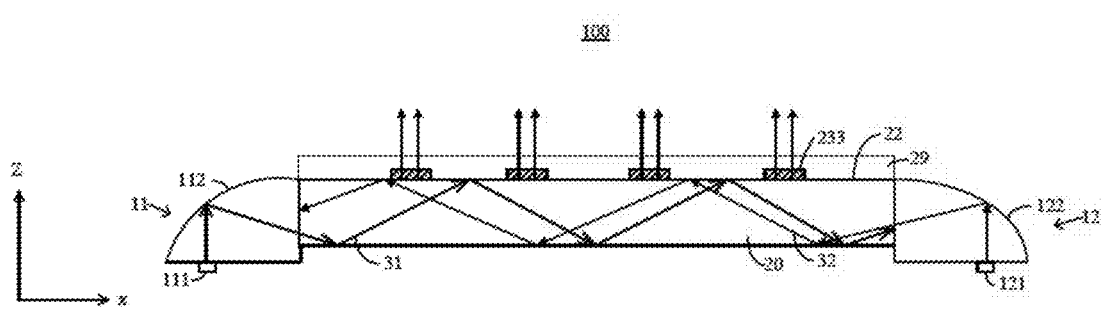
FIG. 2 illustrates a cross-sectional view of the backlight module as illustrated in FIG. 1 along an x-z plane.
Figure 3:
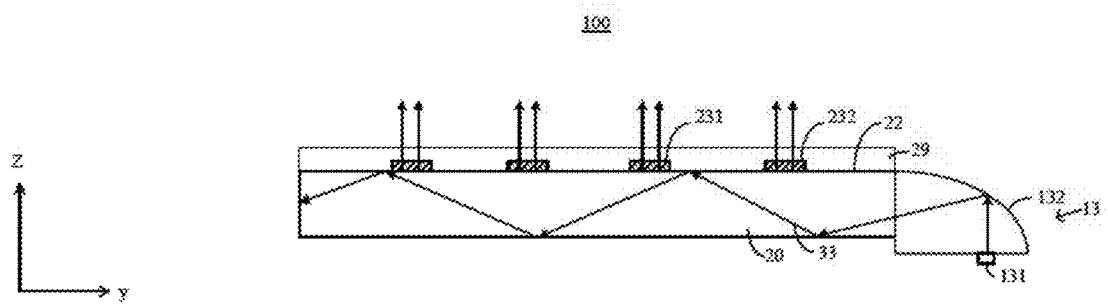
FIG. 3 illustrates a cross-sectional view of the backlight module as illustrated in FIG. 1 along a y-z plane.

In order to more clearly explain the purpose, technical solutions and advantages of the disclosure, a detailed description of embodiments of the disclosure will be provided with reference to the accompanying drawings. It is noticed that the following description of embodiments is merely intended to interpret and illustrate a general concept of the disclosure, rather than being construed as a limitation of the disclosure. In the specification and drawings, same or similar reference numerals refer to same or similar components or members. For clarity, the drawings are not necessarily drawn to scale, and some known parts and structures may be omitted in the drawings.

Unless otherwise defined, the technical or scientific terms used in the present disclosure shall have usual meanings understood by those skilled in the art to which this disclosure belongs. Words "first", "second" and similar words used in this disclosure do not indicate any order, quantity or importance, but are merely used to distinguish different components. A word "a/an" or "one" does not exclude any quantity of more than one. Words such as "comprise" or "comprise" or the like may mean that the elements or objects appearing before the word may cover the elements or objects and their equivalents as listed thereafter, without excluding other elements or objects. A word such as "connected" or "connecting" or the like may not be limited to physical or mechanical connections, but may comprise, for example, electrical connections, whether direct or indirect. Words such as "Up", "Down", "Left". "Right", "Top" or "Bottom" and the like may merely be used to indicate a relative positional relationship. When an absolute position of an object as described changes, then, the relative positional relationship may also be changed accordingly. When an element such as a layer, a film, a region, or a base substrate is referred to as being "on" or "under" another element, the element may be "directly" above or below the other element by abutting against the latter, or there may be intermediate element(s) therebetween.

Respective dimension and shape of each component in the drawings are merely intended to exemplarily illustrate the contents of embodiments of the disclosure, rather than to demonstrate the practical dimension or proportion of film layers and components of the backlight module and the display device in the embodiment of the present disclosure.

According to an overall technical concept of embodiments of the present disclosure, it is intended to provide a backlight module which is capable of implementing/realizing a colored dot-matrix collimated light extraction in embodiments of the disclosure. As illustrated in FIGS. 1 to 4, in some embodiments, the backlight module 100 comprises, for example, a light source assembly and a light guiding plate 20. The light source assembly is configured to emit a plurality of light beams of different colors, for example comprising, a light beam of a first color, a light beam of a second color, and a light beam of a third color. The first color, the second color and the third color are for example different colors which may be mixed with each other or one another so as to obtain a white color typically, the light beams of multiple colors are, for example more specifically, collimated light beams, for example comprising a collimated light beam 31 of the first color, a collimated light beam 32 of the second color, and a collimated light beam 33 of the third color. The light guiding plate 20 comprises a plurality of light incident portions (e.g., a first light incident portion 211, a second light incident portion 212, and a third light incident portion 213, which are configured to receive light beams of different colors from the light source assembly, respectively, such as the collimated light beam 31 of the first color, the collimated light beam 32 of the second color, and the collimated light beam 33 of the third color) and a light emergent surface 22. And, more specifically, the light source assembly comprises, for example, a single first sub-light source configured to emit the light beam of the first color (e.g., the collimated light beam 31 of the first color), a single second sub-light source configured to emit the light beam of the second color (e.g., the collimated light beam 32 of the second color), and a single third sub-light source configured to emit the light beam of the third color (e.g., the collimated light beam 33 of the third color), respectively; in other words, an orthographic projection of the single first sub-light source on a side of the light guiding plate 20 which side the single first sub-light source faces for example at least partially overlaps with an orthographic projection of the first light incident portion 211 on a side of the light guiding plate 20 which side the first light incident portion 211 faces, an orthographic projection of the single second sub-light source on a side of the light guiding plate 20 which side the single second sub-light source faces for example at least partially overlaps with an orthographic projection of the second light incident portion 212 on a side of the light guiding plate 20 which side the second light incident portion 212 faces, and an orthographic projection of the single third sub-light source on a side of the light guiding plate 20 which side the single third sub-light source faces for example at least partially overlaps with an orthographic projection of the third light incident portion 213 on a side of the light guiding plate 20 which side the third light incident portion 213 faces, respectively. Or, alternatively, the light source assembly comprises, for example, a plurality of first sub-light sources configured to emit the light beam of the first color (e.g., the collimated light beam 31 of the first color), a plurality of second sub-light sources configured to emit the light beam of the second color (e.g., the collimated light beam 32 of the second color), and a plurality of third sub-light sources configured to emit the light beam of the third color (e.g., the collimated light beam 33 of the third color), respectively, and the first light incident portion 211 corresponds to the plurality of first sub-light sources, the second light incident portion 212 corresponds to the plurality of second sub-light sources, and the third light incident portion 213 corresponds to the plurality of third sub-light sources, respectively; in other words, orthographic projections of the plurality of first sub-light sources on a side of the light guiding plate 20 which side the plurality of first sub-light sources face for example at least partially overlap with (by way of example, completely overlap with (in such a condition the expression "correspond(s) to" refers to "completely align(s) with")) an orthographic projection of the first light incident portion 211 on a side of the light guiding plate 20 which side the first light incident portion 211 faces, orthographic projections of the plurality of second sub-light sources on a side of the light guiding plate 20 which side the plurality of second sub-light sources face for example at least partially overlap with (by way of example, completely overlap with (in such a condition the expression "correspond(s) to" refers to "completely align(s) with")) an orthographic projection of the second light incident portion 212 on a side of the light guiding plate 20 which side the second light incident portion 212 faces, and orthographic projections of the plurality of third sub-light sources on a side of the light guiding plate 20 which side the plurality of third sub-light sources face for example at least partially overlap with (by way of example, completely overlap with (in such a condition the expression "correspond(s) to" refers to "completely align(s) with")) an orthographic projection of the third light incident portion 213 on a side of the light guiding plate 20 which side the third light incident portion 213 faces, respectively. In the present disclosure, said "light incident portion" does not specifically refer to an individual component, and for example, it is a portion of the light guiding plate 20 which portion is configured to receive light that is incident thereon, such as a surface, an area and the like, which is configured to receive a certain light beam. The "light incident portion" may comprise, for example, a continuous light-transmitting area, and may also comprise, for example, a discontinuous light-transmitting area (which may be referred as a light-incident region). By way of example, the plurality of light incident portions are configured to receive collimated light beams of different colors, respectively. The light emergent surface 22 is provided thereon with a plurality of pixel backlight regions 23 configured to provide backlight for the plurality of pixel regions on a liquid crystal panel, respectively. It should be noted that, the light beams emitted by the light source assembly and the light beams received by the light incident portions are not limited to the collimated light beams.

In the present disclosure, the expression "pixel backlight regions" refers to regions on the light emergent surface 22 corresponding to pixels on the liquid crystal panel of the display device. Each pixel backlight region 23 corresponds to a respective one display pixel (a display pixel comprises several sub-pixels, for example). A light beam emitted from a single pixel backlight region 23 will be used to illuminate a single pixel region (which may for example comprise several sub-pixel regions, such as red sub-pixel region(s), green sub-pixel region(s), and blue sub-pixel region(s)) on the liquid crystal panel; in other words, the expression of "correspond to" herein means that an orthographic projection of each pixel backlight region 23 on the liquid crystal panel at least partially overlaps with, for example completely overlaps with (in such a condition the expression "correspond(s) to" refers to "completely align(s) with"), a respective single pixel region. A plurality of light extraction devices are contained in at least one (for example, each) pixel backlight region 23. The plurality of light extraction devices are configured to guide the collimated light beams of different colors from the plurality of light incident portions (for example, in a direction perpendicular to the light emergent surface 22) to exit from the light emergent surface 22. For example, the light beams of a plurality of colors emitted by the light source assembly comprise, for example, the light beam of the first color (for example, emitted by the single first sub-light source or the plurality of first sub-light sources) and the light beam of the second color (for example, by the single second sub-light source or the plurality of second sub-light sources); and accordingly, the plurality of light extraction devices comprise: at least one first light extraction device configured to guide the light beam of the first color (e.g., the collimated light beam 31 of the first color), for example from at least a first light incident portion), to exit from the light emergent surface 22, and at least one second light extraction device configured to guide the light beam of the second color (e.g. the collimated light beam 31 of the second color), for example from at least a second light incident portion, to exit from the light emergent surface 22. By way of example, the pixel backlight regions 23 are arranged, for example, in a matrix form.

By means of the above solution, each pixel backlight region 23 provides, for example, exiting light beams of multiple colors to meet the requirements of colored display. As such, for example, by using light-emitting devices that directly emit monochromatic light beams of different colors respectively to act as sub-light sources for emitting light of different colors, then it is possible to avoid additional usage of optical components that may cause loss of optical energy, such as color filter layers, beam splitters, and polarizers and the like, in a case where merely monochromatic light source(s) such as white light source(s) or natural light source(s) may be used in a liquid crystal display device. Moreover, the above effect is achieved by the arrangement of light source (comprising, for example, two or more sub-light sources that emit monochromatic light beams of different colors respectively) and the provision of the pixel backlight regions (which have light extraction devices) on the light emergent surface; and as compared with a backlight module in a relevant liquid crystal display device, a thickness of the backlight module according to the embodiment of the present disclosure does not increase significantly, facilitating realizing a thinner and lighter display device.

By way of example, considering that a single pixel is formed by three sub-pixels (for example, typically comprising a red (R) sub-pixel, a green (G) sub-pixel, and a blue (B) sub-pixel; or, for example, comprising a magenta (M) sub-pixel, a yellow (Y) sub-pixel and a cyan (C) sub-pixel; or the like), then, in some embodiments, as illustrated in FIGS. 1 to 4, the light source assembly comprises, for example, a first collimated light source 11 serving as the first sub-light source, a second collimated light source 12 serving as the second sub-light source and a third collimated light source 13 serving as the third sub-light source, which are arranged at different sides of the light guiding plate 20 respectively to serve as side-entry type (i.e., side-incident) sub-light sources. The first collimated light source 11 is configured to emit the collimated light beam 31 of the first color (e.g., red). The second collimated light source 12 is configured to emit the collimated light beam 32 of the second color (e.g., green). The third collimated light source 13 is configured to emit the collimated light beam 33 of the third color (e.g., blue). Accordingly, the plurality of light incident portions comprise the first light incident portion 211, the second light incident portion 212, and the third light incident portion 213, which are for example respectively disposed on sides of the first collimated light source 11, the second collimated light source 12 and the third collimated light source 13 which sides face towards the light guiding plate 20, as illustrated in FIGS. 1-4. By way of example, the first light incident portion 211 is configured to receive the collimated light beam 31 of the first color (e.g., red) from the first collimated light source 11, the second light incident portion 212 is configured to receive the collimated light beam 32 of the second color (e.g., green) from the second collimated light source 12, and the third light incident portion 213 is configured to receive the collimated light beam 33 of the third color (e.g., blue) from the third collimated light source 13. In the above example, the light source assembly comprises the first collimated light source 11, the second collimated light source 12, and the third collimated light source 13. Since the collimated light beams emitted by the collimated light sources have relatively high directivity, then mutual interference between or among light beams of different colors may be prevented. However, the embodiments of the present application are not limited thereto. For example, in some other embodiments, the first collimated light source 11, the second collimated light source 12, and the third collimated light source 13 may also be replaced by other light sources, for example, by non-collimated light sources, such as, in the form of point light sources, surface light sources, or linear light sources.

By way of example, the plurality of light extraction devices in each pixel backlight region 23 comprise, for example, one or more first light extraction devices 231, one or more second light extraction devices 232, and one or more third light extraction devices 233. Said one or more first light extraction devices 231 may be configured to guide the collimated light beam 31 of the first color from the first light incident portion 211 to exit from the light emergent surface 22 in the direction perpendicular to the light emergent surface 22. Said one or more second light extraction devices 232 may be configured to guide the collimated light beam 32 of the second color from the second light incident portion 212 to exit from the light emergent surface 22 in the direction perpendicular to the light emergent surface 22. Said one or more third light extraction devices 233 may be configured to guide the collimated light beam 33 of the third color from the third light incident portion 213 to exit from the light emergent surface 22 in the direction perpendicular to the light emergent surface 22. Therefore, collimated light beams of three colors may be emitted from each pixel backlight region 23, and the collimated light beams of three colors, after exiting from the light emergent surface 22, are for example respectively corresponding to sub-pixels of three colors; as used herein, the expression "corresponding to" refers to that an orthographic projection of a single light extraction device in each pixel backlight region 23 on the liquid crystal panel at least partially overlap with (by way of example, completely overlap with (in such a condition the expression "correspond(s) to" refers to "completely align(s) with")) a respective sub-pixel in the respective single pixel region, such that the sub-pixels of the three colors are lit upon respectively, by the collimated light beams of the three colors once exiting; in other words, the light extraction device and the light beams which are guided therethrough to exit (e.g., the collimated light beams) are hereinafter referred to be in "matching" relationship, satisfying requirements of colored display. By way of example, each of the above light extraction devices comprises, for example, a light extraction grating, which is designed depending on the color (wavelength) of the collimated light beam to which it is matched. For example, the first light extraction device 231 is, for example, a first light extraction grating configured to extract the collimated light beam 31 of the first color; the second light extraction device 232 is, for example, a second light extraction grating configured to extract the collimated light beam 32 of the second color, the third light extraction device 233 is, for example, a third light extraction configured to extract the collimated light beam 33 of the third color. In the above embodiment, the collimated light beam 31 of the first color, the collimated light beam 32 of the second color, and the collimated light beam 33 of the third color all exit from the light emergent surface 22 in the direction perpendicular to the light emergent surface 22. However, the embodiments of the present application are not limited thereto; for example, in some other embodiments, the light beams may also exit in other ways, for example.

By way of example, the plurality of pixel backlight regions 23 on the light emergent surface 22 are arranged in a matrix, for example.

Figure 4:
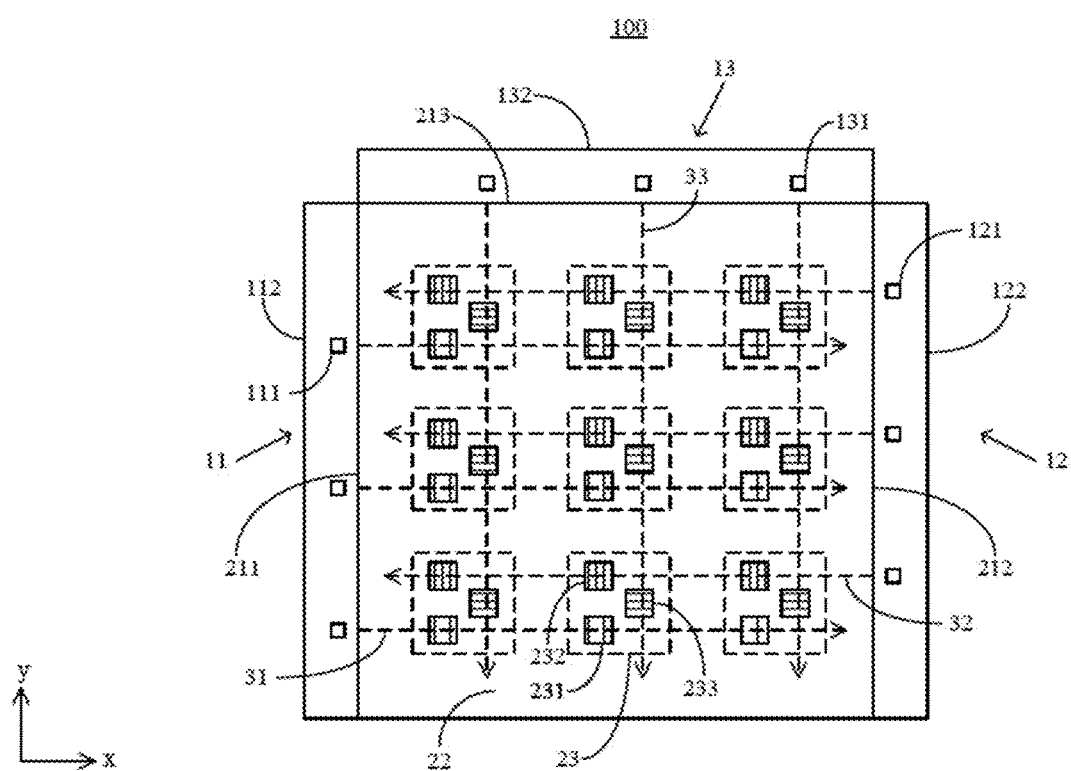
FIG. 4 illustrates a top view of the backlight module as illustrated in FIG. 1.

In the embodiment of the present disclosure, it is necessary to extract collimated light beams of multiple colors from each pixel backlight region 23. In such a backlight module, a design for paths of the collimated light beams will affect light output effect of the backlight module. In order to prevent mutual interference between or among collimated light beams of different colors, by way of example, the first light incident portion 211, the second light incident portion 212, and the third light incident portion 213 are for example provided on different sides of the light guiding plate 20 respectively to function as side-entry type sub-light sources. For example, in the example as illustrated in FIG. 4, the first light incident portion 211 that receives and transmits the collimated light beam 31 of the first color is provided on a left side of the light guiding plate 20, the second light incident portion 212 that receives and transmits the collimated light beam 32 of the second color is provided on a right side of the light guiding plate 20, and the third light incident portion 213 that receives and transmits the collimated light beam 33 of the third color is provided on a rear side of the light guiding plate 20 (illustrated to be on upper side of in FIG. 4), and the first light incident portion 211 located on the left side of the light guiding plate 20 and the second light incident portion 212 located on the right side of the light guiding plate 20 are opposite to each other. By way of example, the first collimated light source 11, the second collimated light source 12, and the third collimated light source 13 are arranged to face the first light incident portion 211, the second light incident portion 212, and the third light incident portion 213, respectively; in other words, the first light incident portion 211, the second light incident portion 212, and the third light incident portion 213 are provided respectively on the sides of the first collimated light source 11, the second collimated light source 12, and the three collimated light sources 13, which sides face towards the light guiding plate 20. The arrangement of the first light incident portion 211, the second light incident portion 212, and the third light incident portion 213 in the embodiments of the present application is not limited to the above situation, and for example, in some other embodiments, two of the first light incident portion 211, the second light incident portion 212 and the third light incident portion 213 are located on a same side, while the other is located on an opposite side, as long as the light beams from the first light incident portion 211, the second light incident portion 212 and the third light incident portion 213 neither coincide with nor interfere with each other or one another.

Figure 5A:
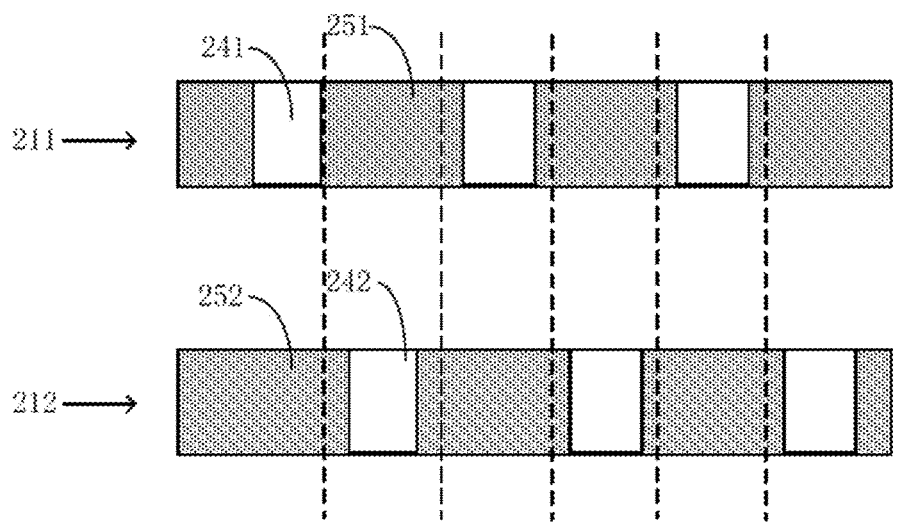
FIG. 5A and FIG. 5B illustrate a light incident portion of a light guiding plate of the backlight module as illustrated in FIG. 1.
Figure 5B:
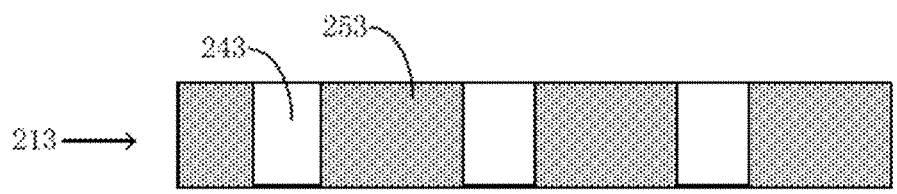

By way of example, as illustrated in FIG. 5A, the first light incident portion 211 may comprise a plurality of first light incident regions 241 spaced apart from each other or one another. As illustrated in FIG. 4, the plurality of first light extraction devices 231 on the light emergent surface 22 are arranged in multiple rows (for example, each row extends along a propagation direction (x direction in FIG. 4) of the collimated light beam 31 of the first color, and the multiple rows are spaced apart from each other and one another in a direction (y direction in FIG. 4) perpendicular to the propagation direction of the collimated light beam 31 of the first color), and each row of the multiple rows of first light extraction devices 231 is aligned with one of the plurality of first light incident regions 241 (i.e., an orthographic projection of each row of the multiple rows of first light extraction devices 231 on a side of the light guiding plate on which side the first light incident portion 211 is provided may at least partially overlap with or even completely overlap with the respective first light incident region 241 in an arrangement direction of the plurality of first light incident regions), such that the collimated light beam incident from the first light incident region 241 may readily illuminate the row of the first light extraction device 231. For example, the plurality of collimated light beams 31 of the first color emitted from the first collimated light source 11 may be incident on and enter the light guiding plate 20 from the plurality of first light incident regions 241 respectively, and are reflected inside the light guiding plate 20 and then guided by the first light extraction device 231 to emit outwards through the light emergent surface 22 (for example, as in FIG. 4, along a direction perpendicular to both x direction and y direction, that is, a direction perpendicular to the paper surface and pointing outwards). Accordingly, as illustrated in FIG. 5A, the second light incident portion 212 may comprise a plurality of second light incident regions 242 spaced apart from each other or one another, and the plurality of first light incident regions 241 of the first light incident portion 211 and the plurality of second light incident regions 242 of the second light incident portions 212 are alternately arranged and staggered with respect to each other, for example, in a same direction (more specifically, for example, alternately arranged and staggered with respect to each other in the y direction as illustrated in FIG. 4). As illustrated in FIG. 4, the plurality of second light extraction devices 232 on the light emergent surface 22 are also arranged in multiple rows (for example, each row extends along a propagation direction (the x direction in FIG. 4) of the collimated light beam 32 of the second color, and the multiple rows of second light extraction devices 232 are spaced apart from each other and one another in a direction (the y direction in FIG. 4) perpendicular to the propagation direction of the collimated light beam 32 of the second color), and each row of the rows of the second light extraction devices 232 is aligned with one of the plurality of second light incident regions 242 (i.e., an orthographic projection of each row of the multiple rows of second light extraction devices 232 on the side of the light guiding plate on which side the second light incidence portion 212 is provided may at least partially overlap with or even completely overlap with the respective second light incident region 242 in the arrangement direction of the plurality of second light incident regions). The plurality of collimated light beams 32 of the second color emitted from the second collimated light source 12 may be incident on and enter the light guiding plate 20 from the plurality of second light incident regions 242 respectively, and are reflected inside the light guiding plate 20 and then guided by the second light extraction device 232 to exit outwards through the light emergent surface 22 (for example, in FIG. 4, along the direction perpendicular to both x direction and y direction, that is, the direction perpendicular to the paper surface and pointing outwards). As illustrated in FIG. 5B, the third light incident portion 213 comprises a plurality of third light incident regions 243 spaced apart from each other or one another. Similarly, the plurality of third light extraction devices 233 on the light emergent surface 22 are, for example, arranged in multiple columns (for example, each column extends along a propagation direction (the y direction in FIG. 4) of the collimated light beam 33 of the third color, and the multiple columns of third light extraction devices 233 are spaced apart from each other and one another in a direction (the x direction in FIG. 4) perpendicular to the propagation direction of the collimated light beam 33 of the third color), and each column of the columns of the third light extraction devices 233 is aligned with one of the plurality of third light incident regions 243 (i.e., an orthographic projection of each column of the multiple columns of third light extraction devices 233 on the side of the light guiding plate on which side the third light incidence portion 213 is provided may at least partially overlap with or even completely overlap with the respective third light incident regions 243 in the arrangement direction of the plurality of third light incident regions). The plurality of collimated light beams 33 of the third color emitted from the third collimated light source 13 may be incident on and enter the light guiding plate 20 from the plurality of third light incident regions 243 respectively, and are reflected inside the light guiding plate 20 and then are guided by the third light extraction device 233 to exit outwards through light emergent surface 22 (for example, in FIG. 4 along the direction perpendicular to both the y direction and the x direction, that is, the direction perpendicular to the paper surface and pointing outwards). And so on, without discussing in this connection repeatedly. By way of example, an extension direction of the rows of the first light extraction devices 231 and an extension direction of the rows of the second light extraction devices 232 (i.e., the x direction in FIG. 4) is perpendicular to, for example, the extension direction of the columns of the third light extraction devices 233 (i.e., the y direction in FIG. 4).

The light incident regions are arranged to be aligned with respective rows or respective columns of light extraction devices, for example, such that the collimated light beams incident from the light incident regions may be correctly extracted by respective light extraction devices. In order to prevent mutual interference between or among different collimated light beams, for example, a light incident region and a respective light extraction device designed for a collimated light beam of a certain color are arranged to be staggered in position from other light extraction regions and other light extraction devices designed for collimated light beams of different colors. By way of example, in addition to the above arrangement of setting the light extraction device designed for the collimated light beam of the certain color to be staggered in position from the light extraction devices for collimated light beams of other colors, for example, the light extraction device designed for the collimated light beam of the certain color may also or otherwise be staggered in position from the light incident regions for the collimated light beams of other colors. Specifically, for example, as illustrated in FIG. 1 and FIG. 4, various first light extraction devices 231 are staggered from all the second light incident regions 242 and all the third light incident regions 243 (i.e., orthographic projections of the various first light extraction devices 231 on the side of the light guiding plate 20 on which side the second light incident portion 212 is provided, do not overlap with the second light incident regions 242 in the arrangement direction of the plurality of second light incident regions, and orthographic projections of the various first light extraction devices 231 on a side of the light guiding plate 20 on which side the third light incident portion 213 is provided, do not overlap with all the third light incident regions 243 in the arrangement direction of the third light incident regions); various second light extraction devices 232 are staggered from all the first light incident regions 241 and all the third light incident regions 243 (i.e., orthographic projections of the various second light extraction devices 232 on the side of the light guiding plate 20 on which side the first light incident portion 211 is provided, do not overlap with the first light incident regions 241 in the arrangement direction of the plurality of first light incident regions, and orthographic projections of the various second light extraction device 232 on the side of the light guiding plate 20 on which side the third light incident portion 213 is provided, do not overlap with all the third light incident regions 243 in the arrangement direction of the third light incident regions); and various third light extraction devices 233 are staggered from all the first light incident regions 241 and all the second light incident regions 242 (i.e., orthographic projections of the various third light extraction device 233 on the side of the light guiding plate 20 on which side the first light incident portion 211 is provided, do not overlap with the first light incident regions 241 in the arrangement direction of the plurality of first light incident regions, and orthographic projections of the various third light extraction device 233 on the side of the light guiding plate 20 on which side the second light incident portion 212 is provided, do not overlap with all the second light incident regions 242 in the arrangement direction of the second light incident regions).

Figure 6:
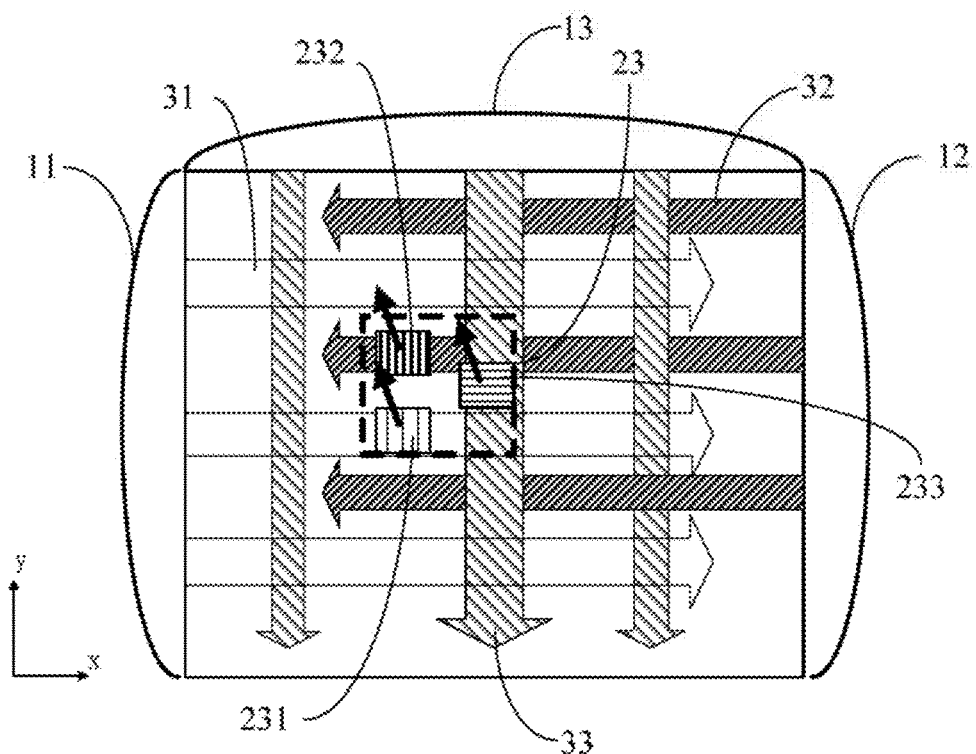
FIG. 6 illustrates a schematic diagram of an operation principle of extracting collimated light beams of different colors in a backlight module according to an embodiment of the present disclosure.

It can be clearly seen from FIG. 6 that the collimated light beam 31 of the first color, the collimated light beam 32 of the second color, and the collimated light beam 33 of the third color are incident on and enter the light guiding plate from three directions, respectively, and travel towards the first light extraction devices 231, the second light extraction devices 232 and the third light extraction devices 233 that they match respectively. This facilitates the extraction of collimated light beams of multiple colors from each pixel backlight region 23 and prevents the collimated light beams of certain colors from being irradiated to unmatched light extraction device(s). Since the parameters of the light extraction devices are designed depending on the wavelengths of the light beams, for example, if the collimated light beam 31 of the first color is irradiated to the second light extraction devices 232 or the third light extraction devices 233, then it is possible that interference to normal light extraction operation of the light extraction devices may be caused. The above arrangement design of the light incident regions and the light extraction devices according to the embodiments of the present disclosure may weaken/alleviate or avoid influence of unmatched collimated light beams of undesired colors (or referred to as undesired wavelengths) on normal light extraction operation of the light extraction devices for the matched collimated light beams.

In some embodiments, as illustrated in FIG. 5A and FIG. 5B, adjacent light incident regions are spaced apart from each other by, i.e., separated by, for example, a light blocking component; or in other words, space between adjacent two light incident regions is filled by the light blocking component. For example, adjacent two first light incident regions 241 of the first light incident portion 211 are separated by, for example, a first light blocking component 251, and adjacent two second light incident regions 242 of the second light incident portion 212 are separated by, for example, a second light blocking component 252 and adjacent two third light incident regions 243 of the third light incident portion 213 are separated by, for example, a third light blocking component 253. By way of example, the first light blocking component 251, the second light blocking component 252, and the third light blocking component 253 are for example formed by a black matrix light blocking layer, or for example formed by any other known light blocking material. For example, FIG. 5A illustrates the first light incident regions 241 and the first light blocking components 251 of the first light incident portion 211 and the second light incident regions 242 and the second light blocking components 252 of the second light incident portion 212. In order to illustrate a positional relationship between the first light incident regions 241 and the first light blocking components 251 and a positional relationship between the second light incident regions 242 and the second light blocking components 252, FIG. 5A illustrates the first light incident portion 211 and the second light incident portion 212 which are juxtaposed to each other. It can be seen that the light incident regions 241 and the second light incident regions 242 are staggered from each other in position. FIG. 5B illustrates the third light incident regions 243 and the third light blocking components 253 of the third light incident portion 213.

Figure 7:
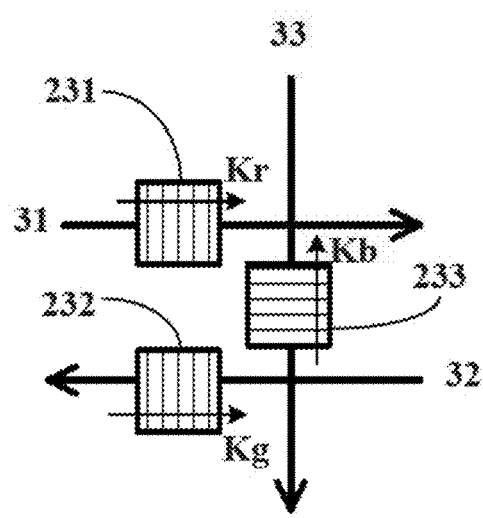
FIG. 7 illustrates a schematic diagram of a grating vector direction of a light extraction grating in the light guiding plate of the backlight module according to an embodiment of the present disclosure.

FIG. 7 illustrates an example of a first light extraction device 231, a second light extraction device 232, and a third light extraction device 233 in the backlight module 100. In this example, the first light extraction device 231, the second light extraction device 232, and the third light extraction device 233 are composed of the first light extraction grating, the second light extraction grating, and the third light extraction grating respectively. Grating vectors of the first light extraction grating, the second light extraction grating, and the third light extraction grating are represented by Kr, Kg, and Kb, respectively. A direction of a grating vector is perpendicular to the extension direction of grating bars of respective grating. The extension directions of illustrated stripes in the first light extraction device 231, the second light extraction device 232, and the third light extraction device 233 in FIG. 7 indicate the directions in which the grating bars extend. In the example as illustrated in FIG. 7, the extension direction of the grating bars of the first light extraction device 231 is perpendicular to the plane where the collimated light beam 31 of the first color is located, the extension direction of the grating bars of the second light extraction device 232 is perpendicular to the plane where the collimated light beam 32 of the second color is located, the extension direction of the grating bars of the third light extraction device 233 is perpendicular to the plane where the collimated light beam 33 of the third color is located.

Figure 8:
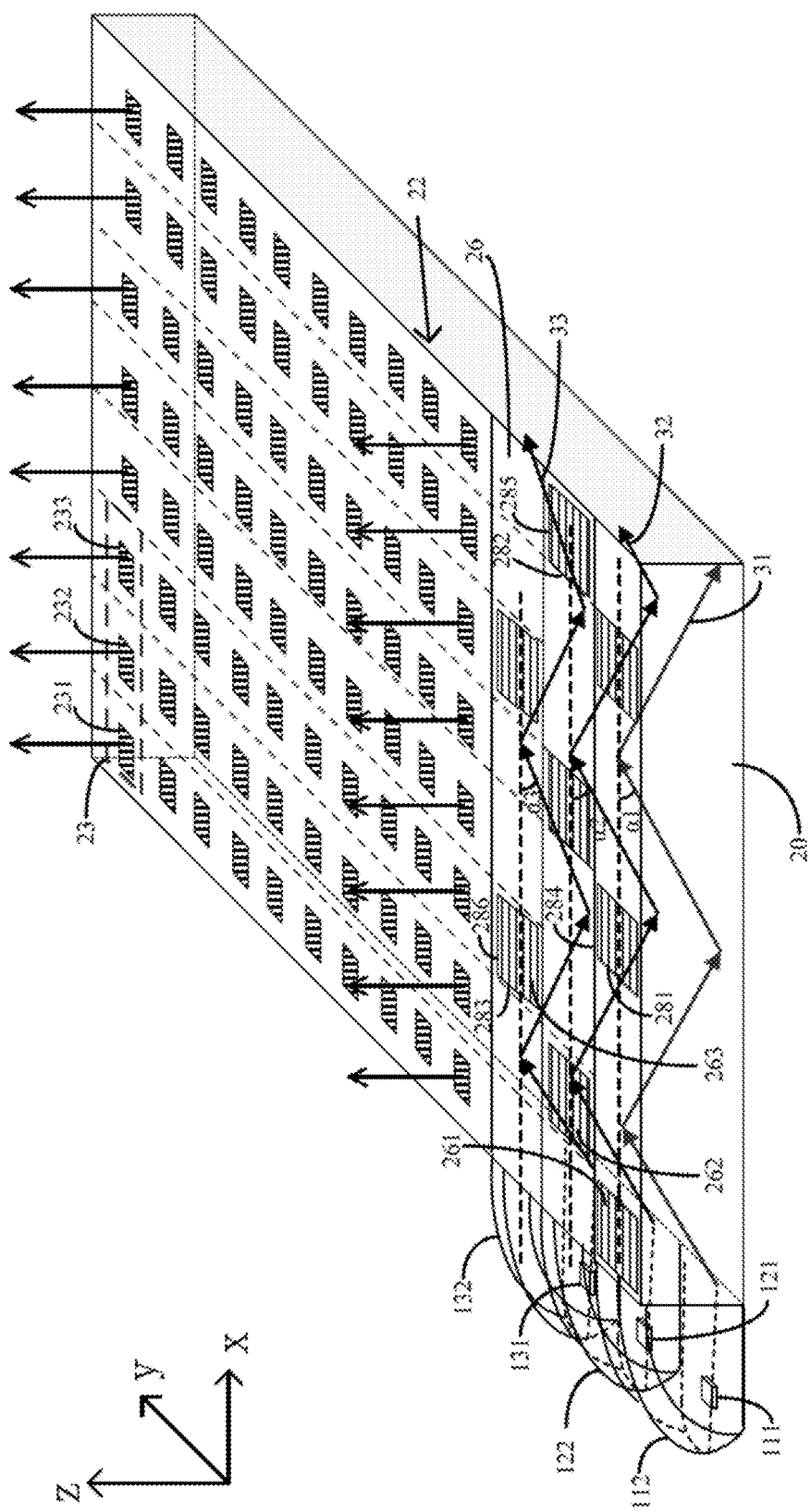
FIG. 8 illustrates a schematic perspective view of a backlight module according to another embodiment of the present disclosure.
Figure 9:
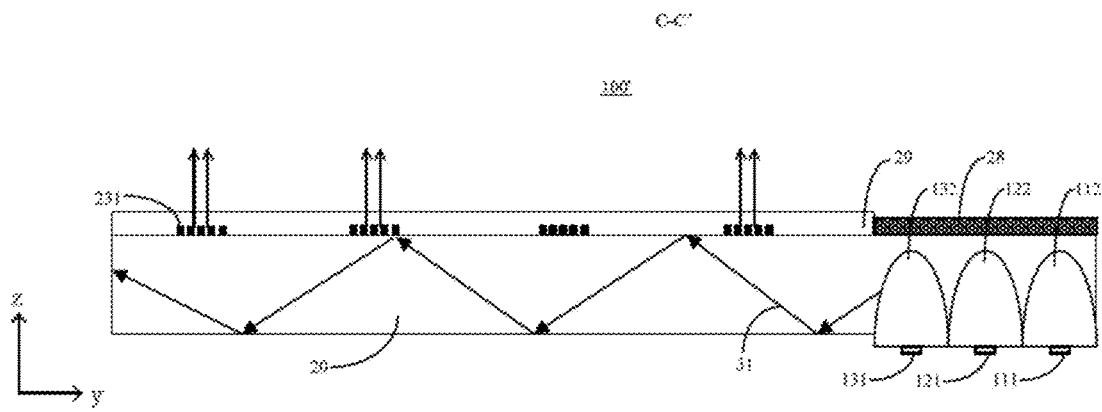
FIG. 9 illustrates a cross-sectional view of the backlight module as illustrated in FIG. 8 along a y-z plane.
Figure 10:
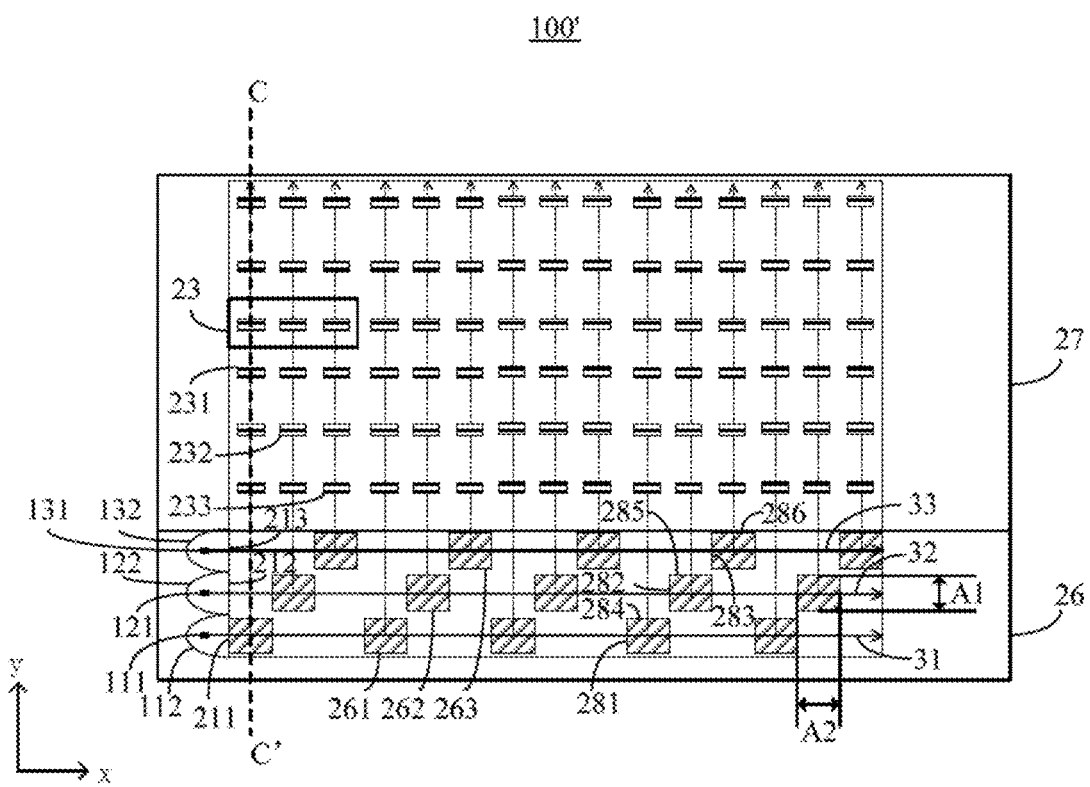
FIG. 10 illustrates a top view of the backlight module as illustrated in FIG. 8.

FIGS. 8 to 10 illustrate a backlight module 100 according to another embodiment of the present disclosure, in which FIG. 9 is a cross-sectional view of the backlight module 100' taken along a cutting line C-C' as illustrated in FIG. 10. In the backlight module 100', the first light incident portion 211, the second light incident portion 212 and the third light incident portion 213 are provided, for example, on the same side of the light guiding plate 20, so that the light beams that come from the light sources and exit via them respectively are parallel to each other and one another. Unlike the backlight module 100 described in the previous embodiment, in the backlight module 100' described with reference to FIGS. 8 to 10, the light emergent surface 22 further comprises an incident light deflection region 26 in addition to the plurality of pixel backlight regions 23 contained therein. As mentioned above, the plurality of pixel backlight regions 23 for example form a display region 27, for extracting collimated light beams of different colors so as to meet requirements for colored image display. The incident light deflection region 26 functions to deflect the collimated light beam 31 of the first color from the first light incident portion 211, the collimated light beam 32 of the second color from the second light incident portion 212, and the collimated light beam 33 of the third color from the third light incident portion 213, respectively, toward the light extraction devices located in the plurality of pixel backlight regions 23 (the light extraction devices comprises: a plurality of first light extraction devices 231 configured to guide the collimated light beam 31 of the first color from the first light incident portion 211 to exit from the light emergent surface 22 along the direction perpendicular to the light emergent surface 22, a plurality of second light extraction devices 232 configured to guide the collimated light beam 32 of the second color from the second light incident portion 212 to exit from the light emergent surface 22 along the direction perpendicular to the light emergent surface 22, and a plurality of third light extraction devices 233 configured to guide the collimated light beam 33 of the third color from the third light incident portion 213 to exit from the light emergent surface 22 along the direction perpendicular to the light emergent surface 22).

By way of example, the incident light deflection region 26 comprises: a plurality of first deflectors (e.g., first deflection gratings 261), a plurality of second deflectors (e.g., second deflection gratings 262), and a plurality of three deflectors (for example, third deflection gratings 263). The plurality of first deflectors are configured to deflect the collimated light beams 31 of the first color from the first light incident portion 211 toward the plurality of first light extraction devices 231, respectively. The plurality of second deflectors are configured to deflect the collimated light beams 32 of the second color from the second light incident portion 212 toward the plurality of second light extraction devices 232, respectively. The plurality of third deflectors are configured to deflect the collimated light beams 33 of the third color from the third light incident portion 213 toward the plurality of third light extraction devices 233, respectively. By means of these deflectors, it is convenient to redirect the collimated light beams of various colors entering the light guiding plate 20, which facilitates the simplification of the light incident portions and arrangement of collimated light sources corresponding to the light incident portions.

Figure 12:
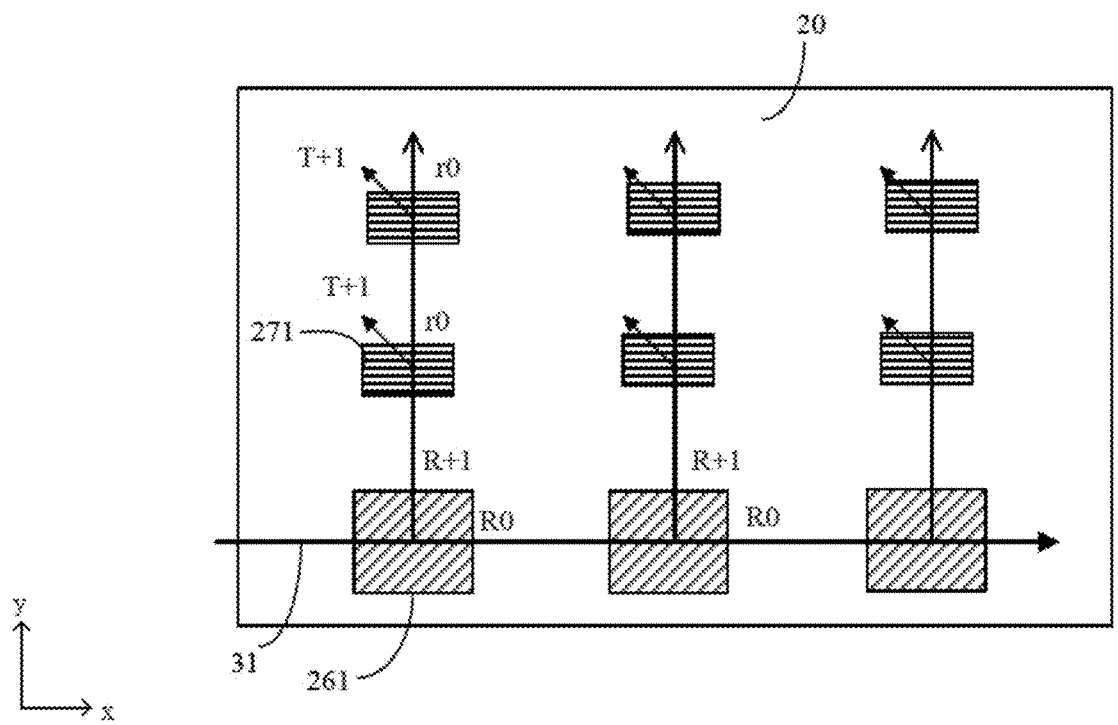

By way of example, each first deflector comprises, for example, a respective first deflection grating 261, each second deflector comprises, for example, a respective second deflection grating 262, and each third deflector comprises, for example, a respective third deflection grating 263. The first deflection gratings 261, the second deflection gratings 262, and the third deflection gratings 263 are all tilted gratings, for example. The first deflection gratings 261, the second deflection gratings 262, and the third deflection gratings 263 will be described below by taking the tilted gratings as an example, but the embodiments of the present disclosure are not limited thereto. The "tilted grating" mentioned here means that, the extension direction of the grating bars in the grating is not perpendicular to the direction of the collimated light beam incident on the gratings (or, the extension direction of the grating bars in the grating is oblique relative to the incident direction of the collimated light beam incident on the gratings). This can be seen visually in FIG. 12. FIG. 12 schematically illustrates a relationship among respective directions of collimated light beams (e.g., the collimated light beam 31 of the first color) incident from the light incident portion, the tilted gratings (e.g., the first deflection grating 261) serving as deflectors, and the light extraction gratings (e.g., the first light extraction gratings 271) serving as the light extraction devices. In FIG. 12, a general traveling direction of the collimated light beam 31 of the first color travelling in the light guiding plate 20 is from left to right, and the illustrated diagonal stripes of the first deflection grating 261 represent the extension direction of the grating bars 264 of the first deflection gratings 261, then it can be seen that the extension direction of the grating bars 264 of the first deflection gratings 261 is not perpendicular to the general traveling direction of the collimated light beam 31 of the first color. Further, considering that the incident direction of the collimated light beam 31 of the first color incident on the first deflection gratings 261 is also inclined with respect to the vertical direction, then, the extension direction of the grating bars 264 of the first deflection gratings 261 is also not perpendicular to the direction of the collimated light beam 31 of the first color incident on the first deflection gratings 261. By way of example, the extension direction of the grating bars 264 of the first light extraction gratings 271 is perpendicular to the incident direction of the collimated light beam 31 of the first color incident on the first light extraction gratings 271. Horizontal stripes of the first light extraction gratings 271 as illustrated in FIG. 12 represent the extension direction of the grating bars of the first light extraction gratings 271. Correspondingly, the extension direction of the grating bars of the second light extraction gratings is also perpendicular to, for example, the incident direction of the collimated light beam 32 of the second color incident on the second light extraction gratings, and the extension direction of the grating bars of the third light extraction gratings is also perpendicular to, for example, the incident direction of the collimated light beam 33 of the third color incident on the third light extraction gratings.

Figure 20:
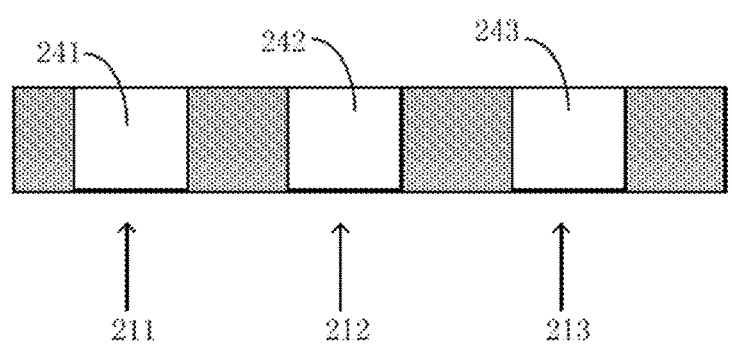
FIG. 20 illustrates a light incident portion of the light guiding plate of the backlight module as illustrated in FIG. 8.

In the above-mentioned backlight module 100' employing a deflector, as an example, as illustrated in FIG. 20, the first light incident portion 211 comprises, for example, the first light incident region 241, the second light incident portion 212 comprises the second light incident region 242, and the third light incident portion 213 comprises the third light incident region 243. It should be noted that the light incident region 241, it is not necessary for the second light incident region 242, and the third light incident region 243 to necessarily mechanically have a shape of notch, but it is only required that the correspondingly matched collimated light beams are allowed to pass therethrough and to be incident on the light guiding plate 20. By way of example, the first light incident region 241, the second light incident region 242 and the third light incident region 243 are separated for example by light blocking components so as to prevent mutual interference between and/or among the collimated light beams, but this is not necessary; for example, there are no light blocking component provided between and/or among the first light incident region 241, the second light incident region 242 and the third light incident region 243, and the first light incident region 241, the second light incident region 242 and the third light incident region 243 are merely arranged to be staggered from each other and/or one another. The first deflection gratings 261 are located in the optical path of the collimated light beams matched therewith between the first light incident region 241 and the plurality of first light extraction devices 231, the second deflection grating 262 are located in the optical path of the collimated light beams matched therewith between the second light incident region 242 and the plurality of second light extraction devices 232, and the third deflection grating 263 are located in the optical path of the collimated light beams matched therewith between the third light incident region 243 and the plurality of third light extraction devices 233, respectively. As illustrated in FIG. 10, the first light incident portion 211, the second light incident portion 212 and the third light incident portion 213 are arranged side by side on the same side of the light guiding plate 20. In the example as illustrated in FIG. 10, a plurality of first deflection gratings 261 are arranged in a row, and orthographic projections of the row of the first deflection gratings 261 on the side of the light guiding plate 20 which side is provided with the first light incident portion 211 may at least partially overlap with or even completely overlap with the first light incident region 241; similarly, a plurality of second deflection gratings 262 are also arranged for example in a row, and orthographic projections of the row of the second deflection gratings 262 on the side of the light guiding plate 20 which side is provided with the second light incident portion 212 may at least partially overlap with or even completely overlap with the second light incident region 242; and a plurality of third deflection gratings 263 are also arranged in a row, for example, and orthographic projections of the third deflection gratings 263 on the side of the light guiding plate 20 which side is provided with the third light incident portion 213 may at least partially overlap with or even completely overlap with the third light incident region 243. By way of example, the plurality of first light extraction devices 231 on the light emergent surface 22 are arranged in multiple columns (for example, in the propagation direction (y direction in FIG. 10) of the collimated light beams 31 of the first color after being deflected by the first deflection gratings 261), the arrangement direction of the first light extraction devices (y direction in FIG. 10) is perpendicular to the arrangement direction of the first deflection gratings (x direction in FIG. 10), a first side 281 of each of the first deflection gratings 261 faces the first light incident region 241, a second side 284 of each of the first deflection gratings 261 adjacent to the first side 281 faces a column of first light extraction devices 231; a plurality of second light extraction devices 231 on the light emergent surface 22 are arranged in multiple rows (e.g., in the propagation direction (y direction in FIG. 10) of the collimated light beams 32 of the second color after being deflected by the second deflection gratings 262, the arrangement direction of the second light extraction devices is also, for example, perpendicular to the arrangement direction of the second deflection gratings, a first side 282 of each of the second deflection gratings 262 faces the second light incident region 242, and a second side 285 of each of the second deflection gratings 262 adjacent to the first side 282 faces a column of second light extraction devices 232; further, a plurality of third light extraction devices 233 on the light emergent surface 22 are arranged in multiple columns, similar to the foregoing (for example, in the propagation direction (y direction in FIG. 10) of the collimated light beams 33 of the third color after being deflected by the third deflection gratings 263, the arrangement direction of the third light extraction device is also for example perpendicular to the arrangement direction of the third deflection gratings, for example, a first side 283 of each of the third deflection gratings 263 faces the third light incident region 243, and a second side 286 of each the third deflection gratings 263 adjacent to the first side 283 faces a column of the third light extraction devices 233.

In some embodiments, a width of each deflection grating is for example set to be equal to a width of a respective light extraction device to ensure that the deflection grating may match the light extraction device in size better so as to improve the light extraction efficiency of the light extraction device. For example, as illustrated in FIG. 10, in a direction perpendicular to the arrangement direction (y direction) of each column of the first light extraction devices 231, the width of each of the first deflection gratings 261 is equal to the width of each of the first light extraction devices 231; in a direction perpendicular to the arrangement direction of each column of the second light extraction devices 232, the width of each of the second deflection grating 262s is equal to the width of each of the second light extraction devices 232; and in a direction perpendicular to the arrangement direction of each column of the third light extraction devices 233, the width of each of the third deflection gratings 263 is equal to the width of each of the third light extraction devices 233. In addition, by way of example, in a direction parallel to the arrangement direction of each row of the first light extraction devices 231, the width of each of the first deflection gratings 261 and the width of each of the second deflection gratings 262 (as shown by A1 in FIG. 10) and the width of each of the third deflection gratings 263 are each set to be less than a certain respective threshold value, such that the first deflection gratings 261, the second deflection gratings 262 and the third deflection gratings 263 do not mutually overlap with each other and/or one another (in other words, more specifically, orthographic projections of the third the first deflection gratings 261, the second deflection gratings 262, and the third deflection gratings 263 on the side of the light guiding plate 20 on which side the first incident portion 211, the second light incident portion 212 and the third light incident portion 213 are disposed side by side do not overlap with one another or one another.

Figure 11:
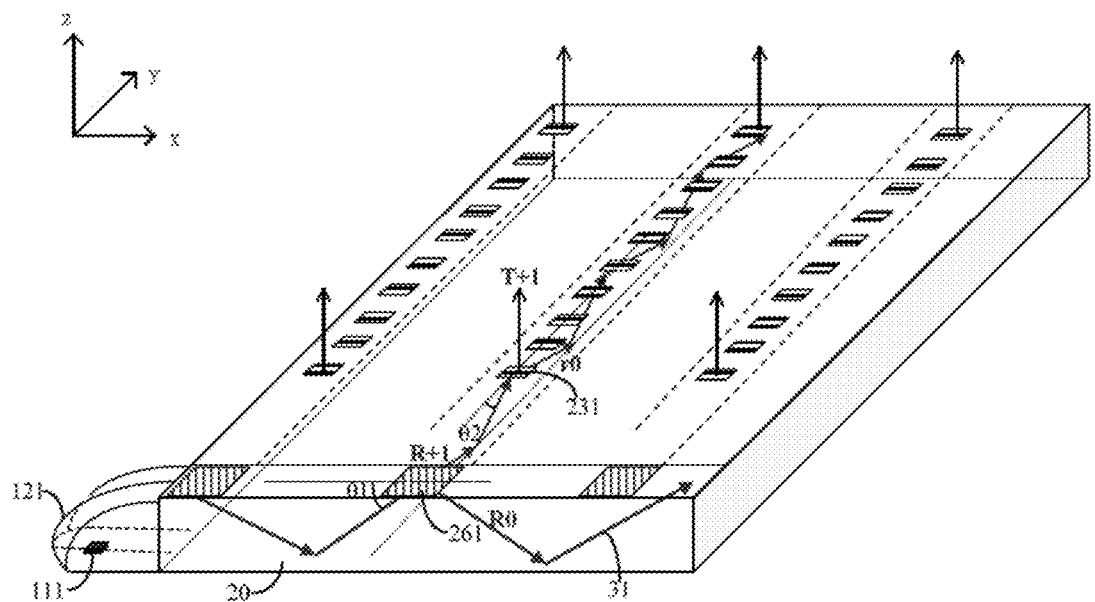
FIG. 11 and FIG. 12 illustrate an operation principle of extracting collimated light in the backlight module as illustrated in FIG. 8.

By way of example, the first deflectors are for example configured to change a deflection direction of the collimated light beams 31 of the first color while maintaining an angle between the collimated light beams 31 of the first color and the light emergent surface 22 unchanged. For example, in the example as illustrated in FIG. 11, the angle θ1 between the collimated light beams 31 of the first color and the light emergent surface 22 before being deflected by the first deflectors is equal to an angle θ2 between the collimated light beam 31 of the first color and the light emergent surface 22 after being deflected by the first deflectors. If the collimated light beams 31 of the first color, before being deflected by the first deflector, are reciprocally reflected in a vertical plane perpendicular to a top surface of the light guiding plate, then, a propagation path of the collimated light beam 31 of the first color, enters another vertical plane perpendicular to a top surface of the light guiding plate from the vertical plane perpendicular to a top surface of the light guiding plate where it is originally located, after being deflected by the first deflectors; in other words, a plane where propagation path of the collimated light beam 31 of the first color is located, after deflected by the first deflector, is deflected around a vertical axis perpendicular to the top surface of the light guiding plate. This way is advantageous for conveniently controlling the traveling direction of the collimated light beams 31 of the first color so as to prevent crosstalk between and/or among different collimated light beams. Accordingly, by way of example, the second deflectors are also configured, for example, to change the deflection direction of the collimated light beams 32 of the second color while maintaining an angle between the collimated light beams 32 of the second color and the light emergent surface 22 unchanged; and the third deflectors are, for example, also configured to change the deflection direction of the collimated light beams 33 of the third color while maintaining an angle between the collimated light beams 33 of the third color and the light emergent surface 22 unchanged.

In some embodiments, the light guiding plate 20 for example further comprises a planarization layer 29. The planarization layer 29 is, for example, located on the light emergent surface 22 and covers the first light extraction devices (gratings) 231, the second light extraction devices (gratings) 232, and the third light extraction devices (gratings) 233. By way of example, a refractive index of the planarization layer 29 may be lower than that of the light guiding plate 20, thereby facilitating a total reflection of each of the collimated light beams in the light guiding plate 20.

By way of example, a light shielding layer 28 is further provided on the incident light deflection region 26, for example. The light shielding layer 28 covers the plurality of first deflectors 231, the plurality of second deflectors 232, and the plurality of third deflectors 233. The light shielding layer 28 is made of, for example, a reflective material or a black light absorbing material, and is configured to prevent light leakage of the incident light deflection region 26 in a direction parallel to a light emergent direction of the light emergent surface 22.

By way of example, in order to enable each collimated light beams to smoothly propagate in the light guiding plate 20, then, each collimated light beam is for example set to be incident obliquely onto and then to enter the light guiding plate. For example, the first collimated light source 11 and the first light incident portion 211 are for example configured to cooperate to transmit the collimated light beams 31 of the first color into the first light incident portion 211 and then to transmit the collimated light beams 31 of the first color to be obliquely incident on and to enter the light emergent surface 22 at a first incidence angle α1; the second collimated light source 12 and the second light incident portion 212 are configured to cooperate to transmit the collimated light beams 32 of the second color into the second light incident portion 212 and then to transmit the collimated light beams 32 of the second color to be obliquely incident on and to enter the light emergent surface 22 at a second incidence angle α2; and the third collimated light source 13 and the third light incident portion 213 are configured to cooperate to transmit the collimated light beams 33 of the third color into the third light incident portion 213 and then to transmit the collimated light beams 33 of the third color to be obliquely incident on and to enter the light emergent surface 22 at a third incidence angle α3.

By way of example, in order to ensure that the light beams may propagate in the light guiding plate in manner of all reflection, the incidence angle (the first incidence angle α1) of the collimated light beams 31 of the first color on the light emergent surface 22 is greater than or equal to a critical angle of total reflection of the collimated light beams 31 of the first color emitted from inside of the light guiding plate toward the light emergent surface 22 and is less than 90°; the incidence angle (the second incidence angle α2) of the collimated light beams 32 of the second color on the light emergent surface 22 is greater than or equal to a critical angle of total reflection of the collimated light beams 32 of the second color from inside of the light guiding plate toward the light emergent surface 22 and is less than 90°; and the incidence angle (third incidence angle α3) of the collimated light beams 33 of the third color on the light emergent surface 22 is greater than or equal to a critical angle of total reflection of the collimated light beams 33 of the third color from inside of the light guiding plate toward the light emergent surface 22 and is less than 90°. It should be understood by those skilled in the art that an incidence angle being greater than or equal to a critical angle of total reflection is a necessary condition for incurring a total reflection, and the critical angle of total reflection is determined by refractive indices of mediums (for example, a medium of the light guiding plate and air, or a medium of the light guiding plate and a cover layer) on both sides at an interface on which a light beam is incident. Since the refractive index of a medium may depend on a wavelength of the incident light, then the critical angle of total reflection may be different for light beams of different colors. The specific calculation of the critical angle of total reflection is well known in the art and will not be described again.

In some embodiments of the present disclosure, as illustrated in FIG. 10, the first collimated light source 11 may comprise one or more first light emitting components 111 and a first reflector cover 112, the second collimated light source 12 may comprise one or more second light emitting components 121 and a second reflector cover 122, and the third collimated light source 13 may comprise one or more third light emitting components 131 and a third reflector cover 132. The first light emitting component(s) 111 may be configured to emit light beams of a first color, and the first reflector cover 112 is configured to collimate the light beams of the first color emitted by the first light emitting component(s) 111 to form the collimated light beams 31 of the first color, for example. The second light emitting component(s) 121 may be configured to emit light beams of a second color, and the second reflector cover 122 is configured to collimate the light beams of the second color emitted by the second light emitting component(s) 121 to form the collimated light beams 32 of the second color, for example. The third light emitting component(s) 131 is configured to emit light beams of a third color, for example, and the third reflector cover 132 is configured to collimate the light beams of the third color emitted by the third light emitting component(s) 131 to form the collimated light beams 33 of the third color. By way of example, each type of the above-mentioned first light emitting component(s) 111, second light emitting component(s) 121, and third light emitting component(s) 131 may comprise, for example, any light emitting component in the relevant art, such as a light-emitting diode (LED) or the like. By way of example, three types of monochromatic light-emitting diodes are for example used as the first light emitting component(s) 111, the second light emitting component(s) 121, and the third light emitting component(s) 131, respectively, bringing about advantages of relatively small size and relatively narrow spectral width and the like. The light emitting diodes used as the light emitting components are, for example, micro-light-emitting diodes (micro-LED), or micro organic light-emitting diodes (micro-OLED), for example. The first reflector cover 112, the second reflector cover 122, and the third reflector cover 132 are, for example, curved reflective collimators (having respective shapes such as parabolic shapes and the like), but shapes and structures of the first reflector cover 112, the second reflector cover 122, and the third reflector cover 132 are not limited thereto, and any reflective collimating device known in the art may be used as these reflector covers. As previously mentioned, in some embodiments, it is desirable that each collimated light beam is set to be incident obliquely onto and to enter the light guiding plate 20, for example, by adjusting an angle of the reflector cover corresponding to each collimated light beam so as to change an emergent direction of the collimation beam. In the embodiments of the present disclosure, the shapes of the first reflector cover 112, the second reflector cover 122, and the third reflector cover 132 may, for example, be the same, but instead, for example, may also be different.

The specific design example of the deflector in the incident light deflection region provided in the light emergent surface will be described below by taking a tilted grating as an example. In the embodiment of the present disclosure, a functioning mechanism of the tilted grating is that, its effective diffraction order is a reflected diffraction order of first (1st) order, i.e., R+1 beam, and a diffraction order maintaining its original beam propagation direction is a transmitted diffraction 0th order RD beam. By designing the structure of the tilted grating (mainly comprising a grating period and a rotation direction of the grating bars thereof), the order R+1 beam is in turn transmitted to an upper side of the light guiding plate 20 (defined with reference to the direction as illustrated in FIG. 12. i.e., in the y direction) and an angle between the order R+1 beam and the light emergent surface 22 inside the light guiding plate is maintained unchanged as compared with the angle between the collimated light beam incident on the respective tilted grating (before diffracted by the tilted gratins) and the light emergent surface 22, that is, 01=2 as illustrated in FIG. 11. Here, a transmission path of the order R+1 beam in the light guiding plate is a region where a respective column of light extraction gratings is located (as illustrated in FIG. 11, for example, the order R+1 beam is transmitted toward the respective column of the light extraction gratings in the light guiding plate, and for example, has a beam width that is substantially the same as or smaller than a dimension of the respective column of light extraction gratings in the x direction so as to exit from the light emergent surface 22 through the respective column of light extraction gratings); that is to say, as illustrated in FIG. 12 viewed from top, the order R+1 beam is deflected by 90° with reference to transmission direction of the collimated light beam before being diffracted by the tilted grating, with the angle between the order R+1 beam and the light emergent surface 22 remaining unchanged. The order R0 beam in FIG. 12 is still a diffraction order beam which maintains the original transmission direction. As illustrated in FIG. 12, when the R0 order beam passes through another tilted grating again, it will generate a reflected diffraction order of −1st order R+1 beam (this part of the light beam is also deflected toward a respective column of light extraction gratings, e.g., the second column of light extraction gratings, in the same way as generation of the previous order R+1 beam for the previous tilted grating) and a reflected diffraction order of the 0$^{th}$ order R0 beam (which continues to maintain its original propagation direction and the angle with reference to the light emergent surface 22, so as to be used for being split once again through the next tilted grating to generate another diffraction order R+1 beam which is deflected toward the next column of light extraction gratings, e.g., the third column of light extraction gratings, for beam extraction by the next column of light extraction gratings).

Figure 13:
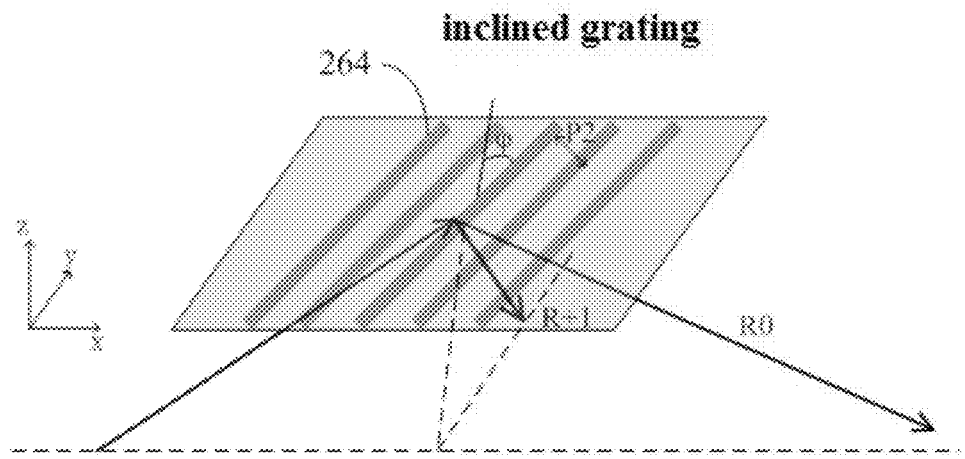
FIG. 13 illustrates a schematic diagram of a design of a deflector in the backlight module as illustrated in FIG. 8.

FIG. 13 illustrates a schematic design diagram of the above-mentioned tilted grating. To achieve the above technical effect, the tilted gratings has two key parameters comprising: a rotation angle φ (the angle between the extension direction of the grating bars 264 and the y-axis), and a period P2 (a pitch between adjacent two grating bars 264), both of which are obtained by the following steps. For convenience of calculation, derivation as below is performed by an x-y-z rectangular coordinate system, as illustrated in FIGS. 11 to 13, to function as a reference coordinate system.

Figure 14:
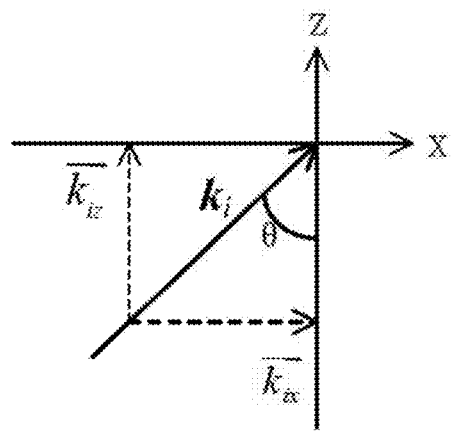
FIG. 14 illustrates a schematic diagram of decomposition of an incident light wave vector as illustrated in FIG. 13 in the x-z plane.

As illustrated in FIG. 14, above all, a light wave vector (hereinafter referred to as "incident light wave vector") of a collimated light beam incident on a tilted grating is decomposed in the x-z plane, and the incident light wave vector ki has components in the three directions of x, y, and z as below:

$$\vec{k_{ix}} = n\frac{2\pi}{\lambda}\sin\theta \quad \text{(Equation 1)}$$
$$\vec{k_{iy}} = 0$$
$$\vec{k_{iz}} = n\frac{2\pi}{\lambda}\cos\theta$$

In equation (1), n is the refractive index of the light guiding plate 20, and θ is the incidence angle of the collimated light beam incident from inside of the light guiding plate to the light emergent surface 22 (or, an incidence angle of the collimated light beam being incident on the light emergent surface when traveling in the light guiding plate 20), λ is the wavelength of the light beam.

Figure 15:
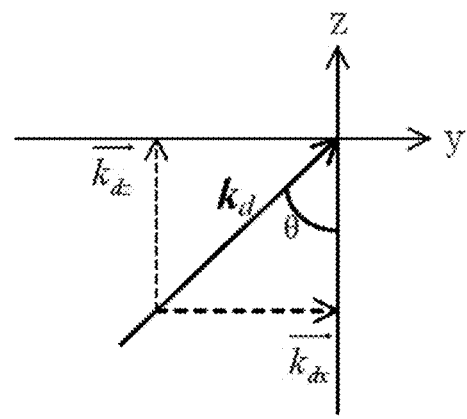
FIG. 15 illustrates a schematic diagram of decomposition of a diffracted light wave vector as illustrated in FIG. 13 in the y-z plane.

Then, as illustrated in FIG. 15, a diffracted light wave vector $k_d$ of the diffraction order R+1 of the light beam diffracted by the tilted grating is decomposed in the y-z plane, and the components of the incident light wave vector $k_d$ in the three directions of x, y and z are respectively represented as below:

$$\vec{k_{dx}} = 0 \quad \text{(Equation 2)}$$
$$\vec{k_{dy}} = n\frac{2\pi}{\lambda}\sin\theta$$
$$\vec{k_{dz}} = n\frac{2\pi}{\lambda}\cos\theta$$

Figure 16:
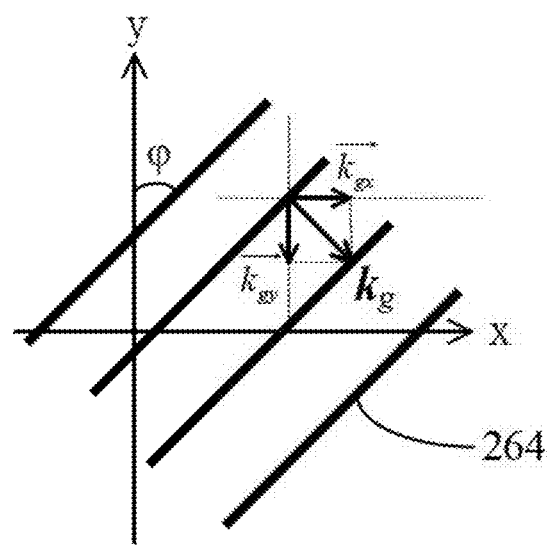
FIG. 16 illustrates a schematic diagram of decomposition of a grating vector as illustrated in FIG. 13 in an x-y plane.

Then, as illustrated in FIG. 16, the grating vector $k_g$ of the tilted grating is decomposed in the x-y plane. The components of the grating vector $k_g$ in both the x and y directions are respectively represented as below:

$$\vec{k_{gy}} = \frac{2\pi}{P_2}\sin\varphi \quad \text{(Equation 3)}$$
$$\vec{k_{gx}} = \frac{2\pi}{P_2}\cos\varphi$$

where φ is the angle between the extension direction of the grating bars of the tilted grating and the y-axis, and P$_2$ is a period of the tilted grating (a pitch between adjacent grating bars).

A matching relationship for various light wave vectors is defined as follows:

$$\vec{k_{gx}} = \vec{k_{ix}} \quad \text{(Equation 4)}$$
$$\vec{k_{gy}} = \vec{k_{dy}}$$

According to the above equation 1 to equation 4, the values of φ and P$_2$ may thus be obtained, i.e., $$P_2 = \frac{\sqrt{2}\lambda}{2n\sin\theta} \quad \text{(Equation 5)}$$
$$\varphi = 45° \quad \text{(Equation 6)}$$

In the calculation process for the above-mentioned exemplary tilted grating, it is assumed that the direction of the light beam, which is redirected after a diffraction by the tilted gratings (for example, the above-mentioned reflected diffraction order of first order R+1 beam), is deflected by 90° relative to its original direction, and the embodiments of the present disclosure are not limited thereto. Therefore, the specific structural parameters of the gratings in the deflector according to the present disclosure are not limited to the specific numerical values listed in Equation 5 and Equation 6 as above. Any other grating structure capable of deflecting the collimated light beam toward the light extraction device (s) may be used in the embodiments of the present disclosure.

Figure 17:
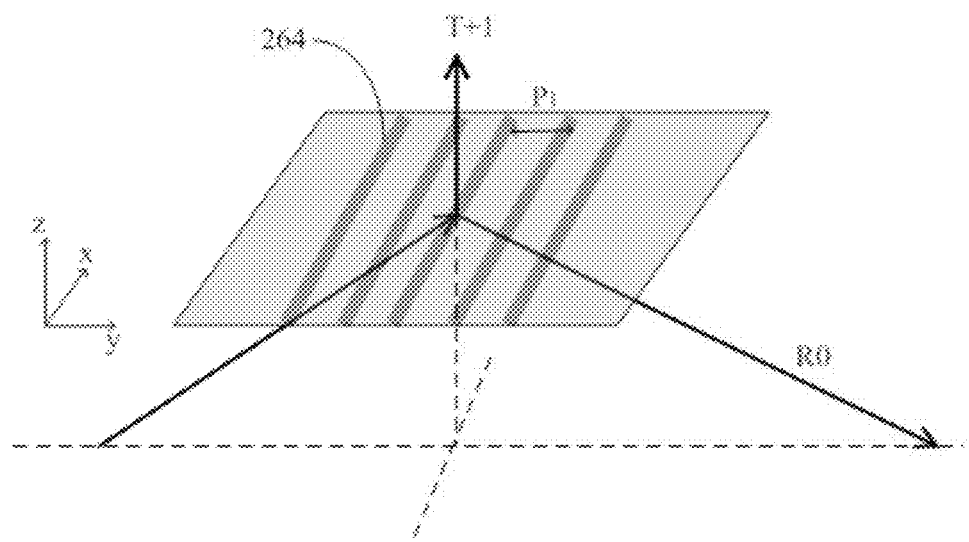
FIG. 17 illustrates a schematic diagram of a design of a light extraction grating in a backlight module according to an embodiment of the present disclosure.

In the following text, a specific design example of a light extraction device is introduced by taking a light extraction grating as an example. As illustrated in FIG. 17, a functioning mechanism of the light extraction gratings is that, for example, it diffracts and decomposes an incident light into a transmitted +1 (diffraction) order T$_{+1}$ beam and a reflected 0 (diffraction) order R$_0$ beam. The transmission +1 (diffraction) order T$_{+1}$ is formed as an emergent light beam perpendicular to the light emergent surface 22 of the light guiding plate 20, and the reflected 0 (diffraction) order R$_0$ beam continues to transmit in the light guiding plate 20. When the reflected 0 (diffraction) order R$_0$ beam is incident on and enters another light extraction grating again, it will be in turn diffracted and decomposed into a new transmission +1 (diffraction) order T$_{+1}$ beam and reflected 0 (diffraction) order R$_0$ beam, and so on, which will be not described repeatedly. In the embodiments of the present disclosure, the light extraction gratings are designed according to the following grating equation 7, for example:

$$\sin\theta - n_2\sin\beta = m\frac{\lambda}{P_1} \quad \text{(Equation 7)}$$

In the equation, n is the refractive index of the light guiding plate 20, and n$_2$ is the refractive index of the medium (for example, the refractive index of the above-described planarization layer 29) that the light beam enters from the light guiding plate 20 at the light extraction gratings, θ is the incidence angle of the collimated light beam from inside of the light guiding plate to the light emergent surface 22 (or, incidence angle of the collimated light beam incident on the light emergent surface upon propagating in the light guiding plate 20), β is an emergent angle of the light beam exiting from the light emergent surface 22 through the light extraction gratings (for example, β is regarded as 0°, for example for the light extraction gratings which extract the light beam in a collimated manner), in is the diffraction order. λ is the wavelength of the light beam, and P1 is the grating period of the light extraction gratings. It can be seen from the equation that for the light extraction gratings that extract the light beam in a collimated manner, the grating period of the light extraction gratings mainly depends on the wavelength of the light beam, the refractive index of the light guiding plate, and the incidence angle of the collimated light beam on the light emergent surface 22 from inside the light guiding plate. In the embodiments of the present disclosure, collimated light beams of multiple wavelengths are used. Therefore, the light extraction gratings are required to be designed and calculated separately for collimated light beams of different colors. The arrangement of the light extraction gratings is as illustrated in FIG. 12, for example, i.e., the extension direction of the grating bars of each of the light extraction gratings is perpendicular to a normal plane of the light extraction gratings where the collimated light beam incident is incident. By way of example, the grating bars of the light extraction grating are arranged for example to be parallel to the light emergent surface 22 and perpendicular to the incident collimated light beams incident thereon.

For example, a duty ratio of the gratings and a depth of the grating bars are used as optimization design parameters of a diffraction efficiency of the gratings, and can be optimized according to the specific backlight efficiency and backlight uniformity.

In the embodiments of the present disclosure, deflectors and light extraction devices of the grating structure facilitate simplifying the structures and manufacturing process thereof, and the above functions may be achieved by formation only a layer of gratings on the light emergent surface 22 of the light guiding plate. In practice, only a layer of simple grating structures is required to be imprinted on the light guiding plate, which is simple in process and convenient for product landing and industrialization. However, in the embodiments of the present disclosure, the light extraction devices and the deflectors are not limited to the grating structure. As to the backlight module according to the embodiment of the present disclosure, since only the light extraction devices and the deflectors (for example, implemented in the form of a grating layer) are provided on the light emergent surface of the light guiding plate, then, extraction of the collimated light beams of multiple colors may be implemented without significantly increasing the thickness of the light guiding plate, thereby facilitating the realization of a slim backlight module and display device. By way of example, the thickness of the light guiding plate 20 is, for example, 0.5 mm, or even smaller.

It should be noted that, since a single pixel may not only be composed of sub-pixels of three colors, for example, but also, alternatively, may be composed of other number of sub-pixels, for example, it may be composed of sub-pixels of four colors (red (R), green (G). Blue (B), white (W); or red (R), green (G), blue (B), yellow (Y)). Therefore, in some embodiments, the backlight module is designed for collimated light beams of other number, except three, of colors. For example, the light source assembly may further comprise: a fourth collimated light source, comprising a single sub-light source or multiple sub-light sources configured to emit collimated light beams of a fourth color; and the plurality of light incident portions may further comprise: a fourth light incident portion configured to receive the collimated light beam(s) of the fourth color. And the light extraction devices in each pixel backlight region may further comprise at least a fourth light extraction device, the fourth light extraction device is configured to extract the collimated light beam(s) of the fourth color from the fourth light incident portion through the light emergent surface, in a direction perpendicular to the light emergent surface. Similarly, when performing design for the sub-pixels corresponding to the four colors, for example, the light extraction devices and/or the deflectors are also correspondingly arranged, the specific content for which will not be repeated.

Embodiments of the present disclosure also provide a display device, comprising the backlight modules 100, 100' and the liquid crystal display assembly 200 as described in any of the above embodiments, wherein the liquid crystal display assembly 200 is located on a side of the backlight module 100, 100' where the light emergent surface 22 is located. The liquid crystal display assembly 200 is used to receive collimated light beams of multiple colors emitted from a plurality of pixel backlight regions 23 on the light emergent surface 22 of the backlight modules 100, 100', so as to provide backlight for the sub-pixels of different colors for implementing colored display.

By way of example, the liquid crystal display assembly 200 for example comprises: a liquid crystal layer 201; first electrodes 202 and second electrodes 203 are located opposite to each other on two different sides of the liquid crystal layer 201 respectively, or on the same side of the liquid crystal layer 201; a plurality of light blocking portions 204 on a side of the liquid crystal layer 201 which side faces away from the backlight module 100, 100, orthographic projections of the plurality of light blocking portions 204 on the light emergent surface 22 respectively covering the light extraction devices in the backlight region 23. Light transmitting openings 207 are provided between and/or among the plurality of light blocking portions 204. The light shielding portions 204 are for example formed by a black matrix material.

The display device is different from a conventional liquid crystal display device comprising two polarizing plates and color filters. In this display device, since the light blocking portions 204 are provided at the position facing the light extraction grating in the liquid crystal module 200, when the light beam collimated from the light extraction grating enters the liquid crystal module, if the liquid crystal layer 201 does not change the direction of the light beam, the light beam will be blocked by the light blocking portions 204 and cannot be emitted from the liquid crystal module 200, thereby realizing a dark state (for example, it can be represented by L0) of display. On the other hand, for example, by applying a set of voltage signals to the liquid crystal layer 201 from the first electrodes 202 and the second electrodes 203, a liquid crystal grating is formed in the liquid crystal layer 201, and the liquid crystal grating can deflect the light beam passing therethrough to cause the light beam to be emitted from the light transmitting opening between the light blocking portions, thereby achieving a bright state (for example, it can be represented by L255) of the display. In addition, for example, the parameters of the liquid crystal grating are designed, and different voltage signals are applied to the liquid crystal, thereby achieving different deflection efficiency of the liquid crystal grating for an incident light, and achieving display of multiple gray levels (for example, can be expressed by L1 to L254 (assuming total number of gray levels is 256)).

Figure 18:
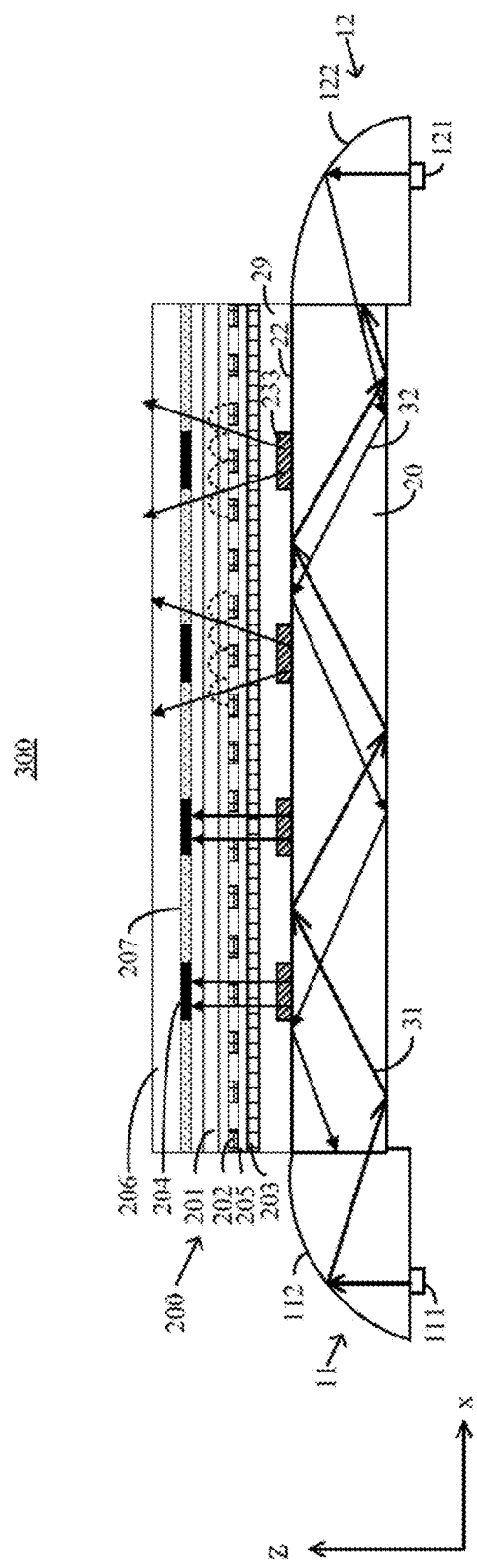
FIG. 18 illustrates a schematic diagram of a display device according to an embodiment of the present disclosure.
Figure 19:
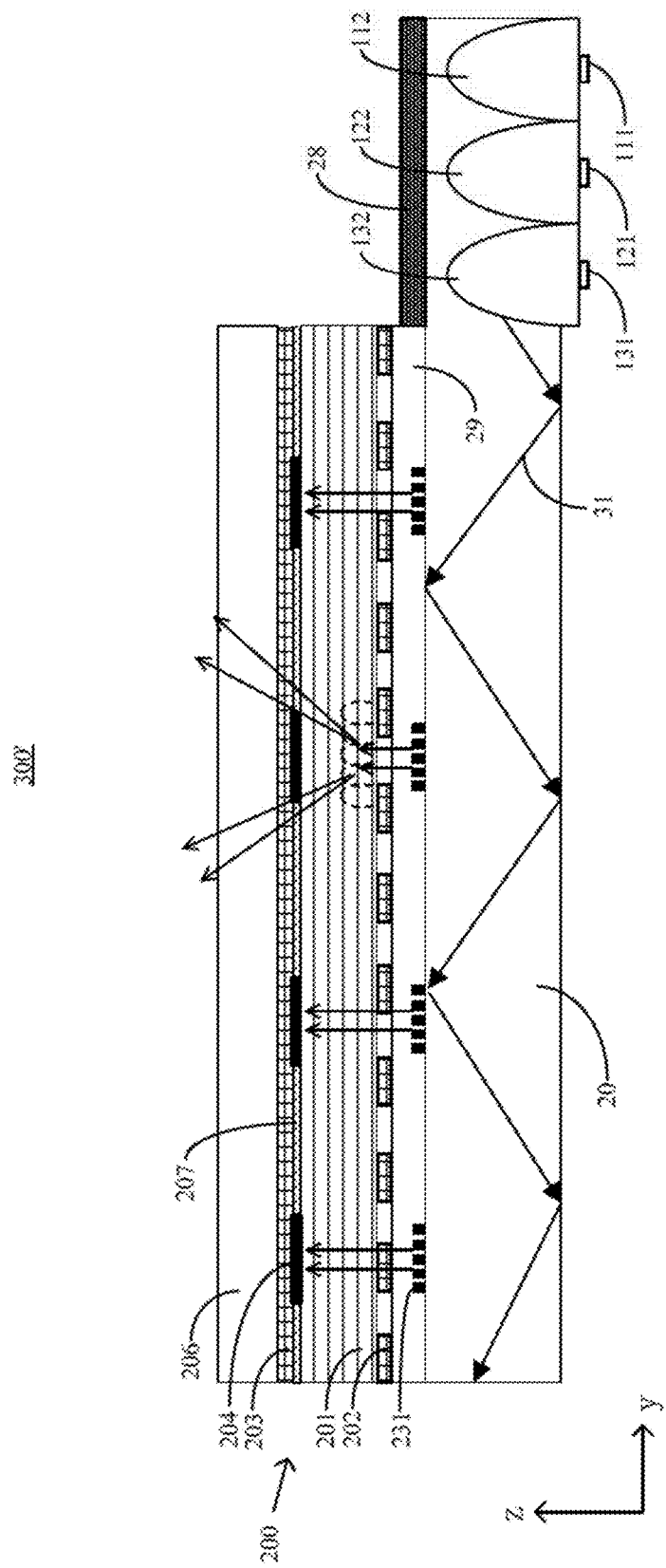
FIG. 19 illustrates a schematic diagram of a display device according to another embodiment of the present disclosure.

FIGS. 18 and 19 respectively illustrate specific examples of the display device 300 comprising the above backlight module 100 (as illustrated in FIG. 1) and the display device 300' comprising the above backlight module 100'(as illustrated in FIG. 9). Among others, in the example as illustrated in FIG. 18, the first electrodes 202 and the second electrodes 203 are located on the same side of the liquid crystal layer 201; while in the example as illustrated in FIG. 19, the first electrodes 202 and the second electrodes 203 are located opposite to each other on two different sides of the liquid crystal layer 201, respectively. However, FIGS. 18 and 19 are merely schematic, and the backlight modules 100 and 100' described in any embodiment of the present disclosure may be located and used on the same side or on two different sides of the liquid crystal layer 201 and used in combination of the first electrodes 202 and the second electrodes 203. In the case where the first electrodes 202 and the second electrodes 203 are located on the same side of the liquid crystal layer 201, an insulating layer 205 is further provided between the first electrodes 202 and the second electrodes 203, for example. The first electrodes 202 and the second electrodes 203 are set, for example, in an ADS (Advanced Super Dimension Switch) mode, but the embodiments of the present disclosure are not limited thereto and the first electrodes 202 and the second electrodes 203 may also be set, for example, in other modes, as long as light beams entering the liquid crystal layer 201 can be deflected away from a region of the light blocking portion when a voltage is applied to the liquid crystal layer 201. By way of example, in order to improve an optical efficiency of the liquid crystal layer, the liquid crystal layer 201 uses, for example, a liquid crystal material involving a relatively large difference in amplitude of refractive index variation. The liquid crystal grating 201 is schematically represented by a plurality of semicircles dotted lines in FIGS. 18 and 19.

By way of example, in order to protect various layer structures of the liquid crystal assembly 200, a transparent substrate 206 (for example, a cover glass) is further provided on the side of the light shielding portion 204 which side faces away from the light guiding plate 20.

Since the backlight modules 100, 100' according to the embodiments of the present disclosure are, for example, configured such that the collimated light beams of multiple colors are provided to respectively illuminate sub pixel regions for each pixel and thus the display devices 300, 300' according to the embodiments of the present disclosure can realize colored display. The display device according to the embodiments of the present disclosure may perform colored display without the requirements of any color filter film and quantum dot materials. The display device according to the embodiments of the present disclosure may be used in the fields of transparent display, augmented reality display, virtual reality display, 3-dimensional display, etc., and has certain application prospects.

Although the present disclosure has been described with reference to the drawings, the embodiments disclosed in the drawings are intended to illustrate the embodiments of the present disclosure, and should not be construed as a limitation of the present disclosure. The dimensions and scales in the drawings are merely schematic and should not be construed as limiting the present disclosure.

The above-mentioned embodiments only exemplarily illustrate the principle and structure of the present disclosure, and are not intended to limit the present disclosure. Those skilled in the art should understand that any changes and improvements made to the present disclosure without departing from the general concept of the present disclosure are within the scope of this disclosure. The protection scope of the present disclosure shall be as defined in the claims of this application.

What is claimed is:

1. A backlight module, comprising:
a light source assembly configured to emit light beams of different colors, the light beams of different colors comprising a light beam of a first color and a light beam of a second color;
a light guiding plate comprising:
a plurality of light incident portions configured to receive the light beams of different colors, and
a light emergent surface,
wherein a plurality of pixel backlight regions are provided on the light emergent surface, and each pixel backlight region comprises a plurality of light extraction devices which comprise: at least a first light extraction device configured to guide the light beam of the first color in the light beams of different colors from the plurality of light incident portions to exit from the light emergent surface; and at least a second light extraction device configured to guide the light beam of the second color in the light beams of different colors from the plurality of light incident portions to exit from the light emergent surface;
wherein the light source assembly comprises:
a first light source configured to emit the light beam of the first color;
a second light source configured to emit the light beam of the second color; and
a third light source configured to emit a light beam of a third color, and the plurality of light incident portions comprise:
a first light incident portion configured to receive the light beam of the first color,
a second light incident portion configured to receive the light beam of the second color, and
a third light incident portion configured to receive the light beam of the third color,
wherein the plurality, of light extraction devices further comprise at least a third light extraction device, and the first light extraction device is configured to guide the light beam of the first color from the first light incident portion along a direction perpendicular to the light emergent surface to exit from the light emergent surface, the second light extraction device is configured to guide the light beam of the second color from the second light incident portion along the direction perpendicular to the light emergent surface to exit from the light emergent surface and, the three light extraction device is configured to guide the light beam of the third color from the third light incident portion along the direction perpendicular to the light emergent surface to exit from the light emergent surface; and
wherein the light emergent surface further comprises an incident light deflection region, and the incident light deflection region is provided with:
a plurality of first deflectors configured to deflect the light beam of the first color from the first light incident portion toward the plurality of first light extraction devices, respectively;
a plurality of second deflectors configured to deflect the light beam of the second color from the second light incident portion toward the plurality of second light extraction devices, respectively; and a plurality of third deflectors configured to deflect the light beam of the third color from the third light incident portion toward the plurality of third light extraction devices, respectively.

2. The backlight module according to claim 1, wherein an incidence angle of the light beam of the first color on the light emergent surface is greater than a critical angle of total reflection of the light beam of the first color from inside the light guiding plate towards the light emergent surface and is less than 90°, an incidence angle of the light beam of the second color on the light emergent surface is greater than a critical angle of total reflection of the light beam of the second color from inside the light guiding plate to the light emergent surface and is less than 90°, and an incidence angle of the light beam of the third color on the light emergent surface is greater than a critical angle of total reflection of the light beam of the third color from inside the light guiding plate to the light emergent surface and is less than 90°.

3. The backlight module according to claim 1, wherein the first light incident portion, the second light incident portion and the third light incident portion are respectively located on different sides of the light guiding plate.

4. The backlight module according to claim 3, wherein,
the first light incident portion comprises a plurality of first light incident regions, and the plurality of first light extraction devices on the light emergent surface are arranged in a plurality of rows, each row of the first light extraction devices is aligned with a respective one of the plurality of first light incident regions;
the second light incident portion comprises a plurality of second light incident regions, and the plurality of second light extraction devices on the light emergent surface are arranged as a plurality of rows, each row of the second light extraction devices is aligned with a respective one of the plurality of second light incident regions; and
the third light incident portion comprises a plurality of third light incident regions, and the plurality of third light extraction devices on the light emergent surface are arranged in a plurality of columns, each column of the third light extraction devices is aligned with a respective one of the plurality of third light incident regions.

5. The backlight module according to claim 4, wherein the first light extraction devices are staggered from all the second light incident regions and all the third light incident regions, the first light incident regions and the second light incident regions are staggered from each other in a direction perpendicular to the light beams of the first color;
the second light extraction devices are staggered from all the first light incident regions and all the third light incident regions; and
the third light extraction devices are staggered from all the first light incident regions and all the second light incident regions.

6. The backlight module according to claim 4, wherein adjacent two of the first light incident regions of the first light incident portion is separated from each other by a first light blocking component, adjacent two of the second light incident regions of the second light incident portion is separated from each other by a second light blocking component, and adjacent two of the third light incident regions of the third light incident portion is separated from each other by a third light blocking component.

7. The backlight module according to claim 1, wherein a light blocking layer is further provided on the incident light deflection region, and the light blocking layer covers the plurality of first deflectors, the plurality of second deflector and the plurality of third deflectors.

8. The backlight module according to claim 1, wherein the first deflectors comprises a plurality of first deflection gratings, the second deflectors comprises a plurality of second deflection gratings, and the third deflectors comprises a plurality of third deflection gratings, respectively.

9. The backlight module according to claim 8, wherein the first light incident portion, the second light incident portion and the third light incident portion are arranged side by side on a same side of the light guiding plate, the first light incident portion comprises a plurality of first light incident regions, the plurality of first deflection gratings are arranged in a row, and orthographic projections of the row of first deflection gratings on the side of the light guiding plate where the first light incident portion is provided at least partially overlap with the first light incident region, the plurality of the first light extraction devices on the light emergent surface are arranged in a plurality of columns, an arrangement direction of the first light extraction devices is perpendicular to an arrangement direction of first deflection gratings, a first side of each of the first deflection gratings faces the first light incident region, and a second side adjacent to the first side of each of the first deflection gratings faces the first light extraction devices;
the second light incident portion comprises a plurality of second light incident regions, the plurality of second deflection gratings are arranged in a row, and orthographic projections of the row of second deflection gratings on the side of the light guiding plate where the second light incident portion is provided at least partially overlap with the second light incident region, the plurality of the second light extraction devices on the light emergent surface are arranged in a plurality of columns, an arrangement direction of the second light extraction devices is perpendicular to an arrangement direction of second deflection gratings, a first side of each of the second deflection gratings faces the second light incident region, and a second side adjacent to the first side of each of the second deflection gratings faces the second light extraction devices; and
the third light incident portion comprises a plurality of third light incident regions, the plurality of third deflection gratings are arranged in a row, and orthographic projections of the row of third deflection gratings on the side of the light guiding plate where the third light incident portion is provided at least partially overlap with the third light incident region, the plurality of the third light extraction devices on the light emergent surface are arranged in a plurality of columns, an arrangement direction of the third light extraction devices is perpendicular to an arrangement direction of third deflection gratings, a first side of each of the third deflection gratings faces the third light incident region, and a second side adjacent to the first side of each of the third deflection gratings faces the third light extraction devices.

10. The backlight module according to claim 9, wherein in a direction perpendicular to the arrangement direction of each column of the first light extraction devices, a width of each of the first deflection gratings is equal to a width of each of the first light extraction devices;
in a direction perpendicular to the arrangement direction of each column of the second light extraction devices, a width of each of the second deflection gratings is equal to a width of each of the second light extraction devices; and in a direction perpendicular to the arrangement direction of each column of the third light extraction devices, a width of each of the third deflection gratings is equal to a width of each of the third light extraction devices.

11. The backlight module according to claim 8, wherein an extension direction of grating bars of each of the first deflection gratings is inclined with respect to an incidence direction of the light beam of the first color on the first deflection gratings;

an extension direction of grating bars of each of the second deflection gratings is inclined with respect to an incidence direction of the light beam of the second color on the second deflection gratings; and an extension direction of grating bars of each of the third deflection gratings is inclined with respect to an incidence direction of the light beam of the third color on the third deflection gratings.

12. The backlight module according to claim 1, wherein the first deflectors are configured to change the deflection direction of the light beam of the first color while maintaining an angle of the light beam of the first color with reference to the light emergent surface unchanged, the second deflectors are configured to change the deflection direction of the light beam of the second color while maintaining an angle of the light beam of the second color with reference to the light emergent surface unchanged, and the third deflectors are configured to change the deflection direction of the light beam of the third color while maintaining an angle of the light beam of the third color with reference to the light emergent surface unchanged.

13. The backlight module according to claim 1, wherein the light beams of different colors emitted by the light source assembly are collimated light beams.

14. The backlight module according to claim 1, wherein the plurality of first light extraction devices comprise first light extraction gratings, and the plurality of second light extraction devices comprise second light extraction gratings and the plurality of third light extraction devices comprise third light extraction gratings.

15. The backlight module according to claim 14, wherein an extension direction of grating bars of the first light extraction gratings is perpendicular to an incidence direction of the light beam of the first color on the first light extraction gratings; an extension direction of grating bars of the second light extraction gratings is perpendicular to an incidence direction of the light beam of the second color on the second light extraction gratings; and an extension direction of grating bars of the third light extraction gratings is perpendicular to an incidence direction of the light beam of the third color on the third light extraction gratings.

16. The backlight module according to claim 14, wherein the light guiding plate further comprises a planarization layer, which is located on the light emergent surface and covers the first light extraction gratings, the second light extraction gratings and the third light extraction gratings, and has a refractive index of the planarization layer lower than a refractive index of the light guiding plate.

17. A display device, comprising:
the backlight module according to claim 1; and
a liquid crystal display assembly located on a side of the backlight module where the light emergent surface is provided.

18. The display device according to claim 17, wherein the liquid crystal display assembly comprises:
a liquid crystal layer;
a plurality of light blocking portions on a side of the liquid crystal layer facing away from the backlight module, orthographic projections of the plurality of light blocking portions on the light emergent surface respectively covering the plurality of light extraction devices in the pixel backlight region, with light transmitting openings being formed between the plurality of light shielding portions; and
first electrodes and second electrodes respectively located on both sides of the liquid crystal layer respectively or on a same side of the liquid crystal layer, the first electrodes and the second electrodes are configured to apply a set of voltage signals to the liquid crystal layer to form a liquid crystal grating configured to deflect light beams passing therethrough to exit from the light transmitting openings between the plurality of light blocking portions.

* * * * *